United States Patent
Yano et al.

(10) Patent No.: US 12,074,348 B2
(45) Date of Patent: Aug. 27, 2024

(54) AUSTENITIC STAINLESS STEEL SHEET FOR FUEL CELL SEPARATORS AND PRODUCTION METHOD THEREFOR

(71) Applicant: JFE STEEL CORPORATION, Tokyo (JP)

(72) Inventors: Takayoshi Yano, Tokyo (JP); Shin Ishikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 537 days.

(21) Appl. No.: 17/423,897

(22) PCT Filed: Jan. 7, 2020

(86) PCT No.: PCT/JP2020/000180
§ 371 (c)(1),
(2) Date: Jul. 19, 2021

(87) PCT Pub. No.: WO2020/153117
PCT Pub. Date: Jul. 30, 2020

(65) Prior Publication Data
US 2022/0085388 A1     Mar. 17, 2022

(30) Foreign Application Priority Data
Jan. 21, 2019 (JP) .............................. 2019-008036

(51) Int. Cl.
*H01M 8/021* (2016.01)
*C21D 8/02* (2006.01)
(Continued)

(52) U.S. Cl.
CPC .......... *H01M 8/021* (2013.01); *C21D 8/0205* (2013.01); *C21D 8/0226* (2013.01);
(Continued)

(58) Field of Classification Search
CPC .................................................. H01M 8/021
See application file for complete search history.

(56) References Cited

U.S. PATENT DOCUMENTS 7,981,570 B2   7/2011   Takai et al.
8,278,009 B2   10/2012  Ishikawa et al.
(Continued)

FOREIGN PATENT DOCUMENTS

CA   3026609 A1   12/2017
CA   3055070 A1   11/2018
(Continued)

OTHER PUBLICATIONS

Mar. 24, 2020, International Search Report issued in the International Patent Application No. PCT/JP2020/000180.
(Continued)

*Primary Examiner* — Olatunji A Godo
(74) *Attorney, Agent, or Firm* — KENJA IP LAW PC

(57) ABSTRACT

An austenitic stainless steel sheet for fuel cell separators comprises a textured structure at a surface of the stainless steel sheet, the textured structure having recessed parts and projected parts, an average height of the projected parts being 30 nm or more and 300 nm or less, and an average interval between the projected parts being 20 nm or more and 350 nm or less, wherein a ratio [Cr]/[Fe] of an atomic concentration of Cr existing in chemical form other than metal to an atomic concentration of Fe existing in chemical form other than metal at the surface of the stainless steel sheet is 1.0 or more.

4 Claims, 3 Drawing Sheets

T : Vertex of projected part
V : Lowest point of recessed part
b : Straight line connecting lowest points of recessed parts adjacent to projected part (on both sides)
h : Distance between straight line b and vertex of projected part Direction parallel to steel sheet surface Thickness (depth) direction of steel sheet

(51) Int. Cl.
    *C21D 9/46* (2006.01)
    *C22C 38/00* (2006.01)
    *C22C 38/02* (2006.01)
    *C22C 38/06* (2006.01)
    *C22C 38/42* (2006.01)
    *C22C 38/58* (2006.01)
    *C23F 1/28* (2006.01)

(52) U.S. Cl.
    CPC .............. *C21D 8/0236* (2013.01); *C21D 9/46* (2013.01); *C22C 38/002* (2013.01); *C22C 38/02* (2013.01); *C22C 38/06* (2013.01); *C22C 38/42* (2013.01); *C22C 38/58* (2013.01); *C23F 1/28* (2013.01)

(56) References Cited

U.S. PATENT DOCUMENTS

| | | | |
|---|---|---|---|
| 9,531,014 | B2 | 12/2016 | Nagoshi et al. |
| 9,587,297 | B2 | 3/2017 | Ishii et al. |
| 9,653,738 | B2 | 5/2017 | Ide et al. |
| 10,714,764 | B2 | 7/2020 | Yano et al. |
| 2003/0224236 | A1 | 12/2003 | Morita et al. |
| 2008/0076001 | A1* | 3/2008 | Uchiyama ........... H01M 8/0228 148/318 |
| 2012/0325673 | A1* | 12/2012 | Wang ................. H01M 8/0215 204/242 |
| 2013/0108945 | A1 | 5/2013 | Ishii et al. |
| 2014/0154129 | A1 | 6/2014 | Makiishi et al. |
| 2014/0272668 | A1* | 9/2014 | Nagoshi ................ C21D 6/004 429/509 |
| 2016/0305011 | A1 | 10/2016 | Wang et al. |
| 2016/0336600 | A1 | 11/2016 | Kagawa et al. |
| 2020/0248332 | A1 | 8/2020 | Yano et al. |
| 2020/0340126 | A1 | 10/2020 | Yano et al. |
| 2022/0085388 | A1 | 3/2022 | Yano et al. |

FOREIGN PATENT DOCUMENTS

| | | |
|---|---|---|
| CN | 1446383 A | 10/2003 |
| CN | 103959524 A | 7/2014 |
| CN | 107849680 A | 3/2018 |
| JP | H08180883 A | 7/1996 |
| JP | 2001064797 A | 3/2001 |
| JP | 2005183338 A | 7/2005 |
| JP | 2005302713 A | 10/2005 |
| JP | 2011149041 A | 8/2011 |
| JP | 2012201950 A | 10/2012 |
| JP | 2013093299 A | 5/2013 |
| JP | 5218612 B2 | 6/2013 |
| JP | 5768641 B2 | 8/2015 |
| KR | 1020150074768 A | 7/2015 |
| KR | 1020160082632 A | 7/2016 |
| WO | 0213300 A1 | 2/2002 |
| WO | 2013080533 A1 | 6/2013 |
| WO | 2015152379 A1 | 10/2015 |
| WO | 2016168649 A2 | 10/2016 |
| WO | 2017110656 A1 | 6/2017 |
| WO | 2018198685 A1 | 11/2018 |
| WO | 2019082591 A1 | 5/2019 |

OTHER PUBLICATIONS

Jul. 20, 2023, Office Action issued by the Korean Intellectual Property Office in the corresponding Korean Patent Application No. 10-2021-7026313 with English language concise statement of relevance.

Feb. 22, 2022, the Extended European Search Report issued by the European Patent Office in the corresponding European Patent Application No. 20745518.9.

H. Tawfik et al., Metal bipolar plates for PEM fuel cell—A review, Journal of Power Sources, 2007, pp. 755-767, vol. 163.

Jan. 23, 2024, Office Action issued by the Korean Intellectual Property Office in the corresponding Korean Patent Application No. 10-2023-7026981 with English language concise statement of relevance.

Jan. 31, 2024, Office Action issued by the China National Intellectual Property Administration in the corresponding Chinese Patent Application No. 202080010055.4 with English language search report.

Peng Zheng-Quan et al., Surface Quality Control of Cold Rolled Austenitic Stainless Steel Strip for Deep Drawing, Surface Technology, Dec. 2007, pp. 93-96, vol. 36, No. 6.

May 31, 2024, Office Action issued by the China National Intellectual Property Administration in the corresponding Chinese Patent Application No. 2020880010055.4 with English language search report.

* cited by examiner

AUSTENITIC STAINLESS STEEL SHEET FOR FUEL CELL SEPARATORS AND PRODUCTION METHOD THEREFOR

TECHNICAL FIELD

The present disclosure relates to an austenitic stainless steel sheet for fuel cell separators and a production method therefor.

BACKGROUND

In recent years, fuel cells that have excellent power generation efficiency and emit no carbon dioxide are being developed for global environment protection. Such a fuel cell generates electricity from hydrogen and oxygen through an electrochemical reaction. The fuel cell has a sandwich-like basic structure, and includes an electrolyte membrane (ion-exchange membrane), two electrodes (fuel electrode and air electrode), gas diffusion layers of $O_2$ (air) and $H_2$, and two separators (bipolar plates).

Fuel cells are classified as phosphoric acid fuel cells, molten carbonate fuel cells, solid oxide fuel cells, alkaline fuel cells, and polymer electrolyte fuel cells (PEFC: proton-exchange membrane fuel cells or polymer electrolyte fuel cells) according to the type of electrolyte membrane used, which are each being developed.

Of these fuel cells, polymer electrolyte fuel cells are particularly expected to be used as power sources in electric vehicles, home or industrial stationary generators, and portable small generators.

A polymer electrolyte fuel cell extracts electricity from hydrogen and oxygen via a polymer membrane. A membrane-electrode joined body is sandwiched between gas diffusion layers (for example, carbon paper) and separators, forming a single component (a single cell). An electromotive force is generated between the separator on the fuel electrode side and the separator on the air electrode side.

The membrane-electrode joined body is called a membrane-electrode assembly (MEA). The membrane-electrode joined body is an assembly of a polymer membrane and an electrode material such as carbon black carrying a platinum catalyst on the front and back surfaces of the membrane. The thickness of the membrane-electrode joined body is several 10 μm to several 100 μm. The gas diffusion layers are often integrated with the membrane-electrode joined body.

In the case of actually using polymer electrolyte fuel cells, several tens to hundreds of single cells such as the above are typically connected in series to form a fuel cell stack and put to use.

The separators are required to function not only as
(a) partition walls separating single cells,
but also as
(b) conductors carrying generated electrons,
(c) air passages through which oxygen (air) flows and hydrogen passages through which hydrogen flows, and
(d) exhaust passages through which generated water or gas is exhausted (the air passages or the hydrogen passages also serve as the exhaust passages).

The separators therefore need to have excellent durability and electric conductivity.

The durability depends on corrosion resistance. This is because, if metal ions are eluted due to separator corrosion, the proton conductivity of the polymer membrane (electrolyte membrane) decreases and the power generation performance decreases.

Regarding the electric conductivity (conductivity), the contact resistance between the separator and the gas diffusion layer is desirably as low as possible, because an increase in the contact resistance between the separator and the gas diffusion layer causes lower power generation efficiency of the polymer electrolyte fuel cell. A lower contact resistance between the separator and the gas diffusion layer contributes to better power generation performance.

Polymer electrolyte fuel cells using graphite as separators have already been in practical use. The separators made of graphite are advantageous in that the contact resistance is relatively low and also corrosion does not occur. The separators made of graphite, however, have the drawback of easily breaking on impact. The separators made of graphite are also disadvantageous in that the size reduction is difficult and the processing cost for forming gas flow passages is high. These drawbacks of the separators made of graphite hinder the widespread use of polymer electrolyte fuel cells.

Attempts have been made to use a metal material as the separator material instead of graphite. In particular, various studies have been conducted to commercialize separators made of stainless steel, titanium, a titanium alloy, or the like for enhanced durability.

For example, JP H8-180883 A (PTL 1) discloses a technique of using, as separators, a metal such as stainless steel or a titanium alloy that easily forms a passive film.

With the technique disclosed in PTL 1, however, the formation of the passive film causes an increase in contact resistance, and results in lower power generation efficiency. The metal material disclosed in PTL 1 thus has problems such as high contact resistance as compared with the graphite material.

To reduce contact resistance, for example, JP 5768641 B2 (PTL 2) discloses a "ferritic stainless steel with excellent corrosion resistance and electric conductivity, containing, in mass %, C: 0.001% to 0.05%, Si: 0.001% to 0.5%, Mn: 0.001% to 1.0%, Al: 0.001% to 0.5%, N: 0.001% to 0.05%, Cr: 17% to 23%, and Mo: 0.1% or less with the balance consisting of Fe and inevitable impurities, and having, at a surface thereof, a layer obtained by immersion in an immersion solution that is mainly made of hydrofluoric acid or hydrofluoric nitric acid and satisfies a relationship $[HF] \geq [HNO_3]$ ... [1], where [HF] represents a concentration of hydrofluoric acid and $[HNO_3]$ represents a concentration of nitric acid".

JP 2013-93299 A (PTL 3) discloses a "method of producing stainless steel for fuel cell separators, comprising: subjecting stainless steel containing 16 mass % or more Cr to electrolysis; and then immersing the stainless steel in a fluorine-containing solution".

JP 5218612 B2 (PTL 4) discloses a "stainless steel for fuel cell separators, containing, in mass %, C: 0.03% or less, Si: 1.0% or less, Mn: 1.0% or less, S: 0.01% or less, P: 0.05% or less, Al: 0.20% or less, N: 0.03% or less, and Cr: 16% to 40%, and one or more selected from Ni: 20% or less, Cu: 0.6% or less, and Mo: 2.5% or less, with the balance consisting of Fe and inevitable impurities, wherein in the case where a surface of the stainless steel is measured by photoelectron spectroscopy, F is detected, and ((Cr+Fe) in chemical form other than metal)/((Cr+Fe) in metal form)≥3.0".

WO 2013/080533 A1 (PTL 5) discloses a "stainless steel for fuel cell separators with low surface contact resistance, containing 16 mass % to 40 mass % Cr, and including a region having a fine textured structure at a surface thereof, an area ratio of the region being 50% or more".

CITATION LIST

Patent Literatures

PTL 1: JP H8-180883 A
PTL 2: JP 5768641 B2
PTL 3: JP 2013-93299 A
PTL 4: JP 5218612 B2
PTL 5: WO 2013/080533 A1
PTL 6: Specification of PCT/JP2018/036111

SUMMARY

Technical Problem

However, when, for mass production of each of the stainless steel sheets disclosed in PTL 2 to PTL 5, immersion in a hydrofluoric acid-containing treatment solution is continuously performed as etching treatment, Fe ions and the like are eluted from the steel sheet as the material to be treated. This may cause the etching performance of the hydrofluoric acid to decrease, and make it impossible to stably achieve desired contact resistance reduction effect.

Moreover, a hydrofluoric acid-containing treatment solution has extremely high chemical activity, which causes a safety problem during treatment. Disposal of waste liquid discharged after treatment also causes a safety problem.

We conducted study to solve the problems stated above, and previously disclosed, in PTL 6, a "production method for a stainless steel sheet for fuel cell separators, comprising: preparing a stainless steel sheet as a material; thereafter removing an oxide layer at a surface of the stainless steel sheet; and thereafter subjecting the stainless steel sheet to electrolytic etching treatment in an active region of the stainless steel sheet".

With the technique described in PTL 6, a stainless steel sheet for fuel cell separators having low contact resistance can be produced more advantageously in terms of mass productivity and safety, without using a hydrofluoric acid-containing treatment solution.

It is commonly known that austenitic stainless steel sheets have better workability than ferritic stainless steel sheets.

Hence, in the case of producing a fuel cell separator of a complex shape with strict working conditions, an austenitic stainless steel sheet is often used as a separator material.

If the technique described in PTL 6 is used for the austenitic stainless steel sheet, the steel sheet immediately after the electrolytic etching treatment has certain low contact resistance. However, when the contact resistance of the steel sheet is measured again after the steel sheet is stored in the air for several days, the contact resistance increases, and certain low contact resistance cannot be obtained in some cases.

It could therefore be helpful to improve the technique described in PTL 6 and provide an austenitic stainless steel sheet for fuel cell separators that can be more advantageously produced in terms of mass productivity and safety without using hydrofluoric acid and has excellent resistance to time degradation of contact resistance.

It could also be helpful to provide an advantageous production method for the austenitic stainless steel sheet for fuel cell separators.

Solution to Problem

We conducted extensive examination to solve the problems stated above.

First, we investigated the reason why the contact resistance degrades over time in the case of using the technique described in PTL 6 for an austenitic stainless steel sheet.

A ferritic stainless steel sheet and an austenitic stainless steel sheet each as a material were prepared, and various stainless steel sheets for fuel cell separators were produced using each of these steel sheets by the production method described in PTL 6 (i.e. removing an oxide layer at the surface of the stainless steel sheet and subjecting the stainless steel sheet to electrolytic etching treatment in its active region). The state of the surface of each produced steel sheet was then studied.

As a result, we discovered the following:

(1) As a result of the electrolytic etching treatment, a fine textured structure is formed at the steel sheet surface both in the case where the ferritic stainless steel sheet is used as the material and in the case where the austenitic stainless steel sheet is used as the material.

Because of the fine textured structure formed at the steel sheet surface, the contact area between the stainless steel sheet (separator) and the gas diffusion layer increases. Hence, low contact resistance is obtained both in the ferritic stainless steel sheet and the austenitic stainless steel sheet immediately after the electrolytic etching treatment.

(2) Meanwhile, from immediately after the electrolytic etching treatment, a passive film forms at the steel sheet surface of each of the ferritic stainless steel sheet and the austenitic stainless steel sheet.

The stability of the passive film differs greatly between the ferritic stainless steel sheet and the austenitic stainless steel sheet.

In detail, the passive film formed in the ferritic stainless steel sheet is relatively stable, and hardly grows (thickens) over time. On the other hand, the passive film formed in the austenitic stainless steel sheet is unstable, and grows (thickens) over time.

Due to this difference in the stability of the passive film, the contact resistance degrades over time in the case of using the austenitic stainless steel sheet as the material.

Based on this examination result, we conducted further examination to prevent the time degradation of the contact resistance in the austenitic stainless steel sheet.

Typically, in stainless steel, the corrosion resistance of the passive film is higher when the Cr content in the steel is higher. We accordingly attempted to stabilize the passive film by increasing the Cr concentration at the steel sheet surface.

We consequently found out that increasing the Cr concentration at the steel sheet surface has the effect of suppressing the time degradation of the contact resistance. This effect alone is, however, not sufficient.

In view of this, we further examined the surface state of the stainless steel sheet, and discovered the following:

It is important to:
(i) suppress the thickening of the passive film as much as possible by increasing the Cr concentration at the steel sheet surface; and
(ii) ensure a sufficient height difference between the recessed and projected parts in the textured structure at the steel sheet surface.

By satisfying both (i) and (ii), low contact resistance can be achieved even after the austenitic stainless steel sheet is stored in the air for a certain period of time.

We consider the reason for this as follows:

(a) As a result of the textured structure being formed at the surface of the stainless steel sheet as the separator, the contact area between the stainless steel sheet and the gas diffusion layer increases, and low contact resistance is obtained. In particular, even when the passive film is formed at the surface of the stainless steel sheet, the passive film in the projected parts at the surface of the stainless steel sheet is partially destroyed due to the contact between the stainless steel sheet and the gas diffusion layer. The destroyed part of the passive film and the carbon fiber of the gas diffusion layer come into contact with each other, that is, the steel substrate of the stainless steel sheet and the gas diffusion layer come into contact with each other without the passive film therebetween, so that low contact resistance is achieved.

(b) However, in the case where the austenitic stainless steel sheet is subjected to the predetermined electrolytic etching treatment and thereafter stored in the air, the passive film thickens over time, as mentioned above. Moreover, fine particles such as dust, organic matter, water vapor, and the like contained in the air may adhere to the steel sheet surface and cause an increase in contact resistance.

(c) This thickening of the passive film can be suppressed as much as possible by increasing the Cr concentration at the steel sheet surface.

In addition, by ensuring a sufficient height difference between the recessed and projected parts in the textured structure at the surface of the stainless steel sheet, the surface pressure on the contact between the projected parts at the surface of the stainless steel sheet and the gas diffusion layer during contact between the stainless steel sheet and the gas diffusion layer increases. Hence, even when the passive film thickens from immediately after the electrolytic etching treatment, the passive film is destroyed easily. Further, the steel sheet is less susceptible to fine particles such as dust, organic matter, water vapor, and the like contained in the air.

(d) By the synergetic effect described above, during contact between the stainless steel sheet and the gas diffusion layer, the passive film in the projected parts at the surface of the stainless steel sheet is partially destroyed.

Therefore, even after the austenitic stainless steel sheet is stored in the air for a certain period of time, the steel substrate of the stainless steel sheet and the gas diffusion layer can be in contact with each other without the passive film therebetween, so that low contact resistance is achieved.

Based on these discoveries, we conducted further study, and discovered the following:

It is important to:

control the average height of the projected parts to 30 nm or more and 300 nm or less and the average interval between the projected parts to 20 nm or more and 350 nm or less in the textured structure at the surface of the stainless steel sheet; and control the ratio [Cr]/[Fe] of the atomic concentration of Cr existing in chemical form other than metal to the atomic concentration of Fe existing in chemical form other than metal to 1.0 or more at the surface of the stainless steel sheet.

By satisfying both of the controls, excellent resistance to time degradation of contact resistance can be achieved.

We also discovered that, in order to obtain the textured structure at the steel sheet surface, it is important to appropriately control the dissolution amount, specifically, control the dissolution amount to a range of 1.0 $g/m^2$ to 20.0 $g/m^2$ in the etching treatment for forming the textured structure.

Furthermore, it is also important to improve the corrosion resistance and particularly the pitting corrosion resistance in a use environment of fuel cell separators.

We examined this point, and discovered that the pitting corrosion resistance is considerably improved by controlling the atomic concentration of N existing at the surface of the stainless steel sheet to 1.0 at % or more.

The present disclosure is based on these discoveries and further studies.

We thus provide:

1. An austenitic stainless steel sheet for fuel cell separators, comprising a textured structure at a surface of the austenitic stainless steel sheet, the textured structure having recessed parts and projected parts, an average height of the projected parts being 30 nm or more and 300 nm or less, and an average interval between the projected parts being 20 nm or more and 350 nm or less, wherein a ratio [Cr]/[Fe] of an atomic concentration of Cr existing in chemical form other than metal to an atomic concentration of Fe existing in chemical form other than metal at the surface of the austenitic stainless steel sheet is 1.0 or more.

2. The austenitic stainless steel sheet for fuel cell separators according to 1., wherein an atomic concentration of N existing at the surface of the austenitic stainless steel sheet is 1.0 at % or more.

3. A production method for an austenitic stainless steel sheet for fuel cell separators, comprising: preparing a blank austenitic stainless steel sheet; thereafter removing an oxide layer at a surface of the blank austenitic stainless steel sheet; thereafter subjecting the blank austenitic stainless steel sheet to etching treatment with a dissolution amount of 1.0 $g/m^2$ to 20.0 $g/m^2$, in an active region of the blank austenitic stainless steel sheet; and thereafter subjecting the blank austenitic stainless steel sheet to immersion in an oxidizing solution or electrolysis in a passive region of the blank austenitic stainless steel sheet.

4. The production method for an austenitic stainless steel sheet for fuel cell separators according to 3., comprising subjecting, before the removing of the oxide layer, the blank austenitic stainless steel sheet to heat treatment under conditions that a treatment atmosphere has a nitrogen concentration of 5 vol % or more and a dew point of −45° C. or less, a maximum temperature is 1000° C. or more and 1200° C. or less, and a residence time in a temperature range of 1000° C. or more is 1 sec or more and 300 sec or less.

Advantageous Effect

It is thus possible to obtain an austenitic stainless steel sheet for fuel cell separators with low contact resistance that is more advantageous in terms of mass productivity and safety and has excellent resistance to time degradation of contact resistance.

Since austenitic stainless steel sheets have better workability than ferritic stainless steel sheets, the use of the austenitic stainless steel sheet for fuel cell separators according to the present disclosure enables production of various fuel cell separators of complex shapes with strict working conditions.

DETAILED DESCRIPTION (1) Austenitic Stainless Steel Sheet for Fuel Cell Separators An austenitic stainless steel sheet for fuel cell separators according to one of the disclosed embodiments will be described below.

In the austenitic stainless steel sheet for fuel cell separators according to one of the disclosed embodiments, it is important to form a fine textured structure having recessed parts and projected parts at its surface and control the shape of the fine textured structure on the order of nm, as mentioned above.

Average Height of Projected Parts: 30 nm or More and 300 nm or Less

The average height of the projected parts needs to be 30 nm or more and 300 nm or less from the viewpoint of achieving excellent resistance to time degradation of contact resistance, as mentioned above.

If the average height of the projected parts is less than 30 nm, the height difference between the recessed and projected parts is excessively small. Accordingly, if the passive film thickens as a result of the stainless steel sheet being stored in the air, the passive film in the projected parts at the surface of the steel sheet is not destroyed during contact between the stainless steel sheet and the gas diffusion layer. This makes it impossible for the steel substrate of the stainless steel sheet and the gas diffusion layer to be in direct contact with each other, as a result of which the contact resistance increases. Moreover, the steel sheet is susceptible to adhesion of fine particles such as dust, organic matter, water vapor, and the like contained in the air.

If the average height of the projected parts is more than 300 nm, the dissolution amount and therefore the etching time in the etching treatment increases, which is disadvantageous in terms of productivity.

The average height of the projected parts is therefore 30 nm or more and 300 nm or less. The average height of the projected parts is preferably 50 nm or more. The average height of the projected parts is preferably 200 nm or less.

The average height of the projected parts is calculated as follows:

A thin-film sample for section observation is produced from an austenitic stainless steel sheet (as a finished product), using a focused ion beam processing device (FIB, Versa 3D DualBeam produced by FEI Company). The sample is then observed for any five observation fields with 50000 magnification using a spherical aberration corrected scanning transmission electron microscope (Cs-corrected STEM, JEM-ARM200F produced by JEOL Ltd.), to obtain TEM images.

Figure 1:
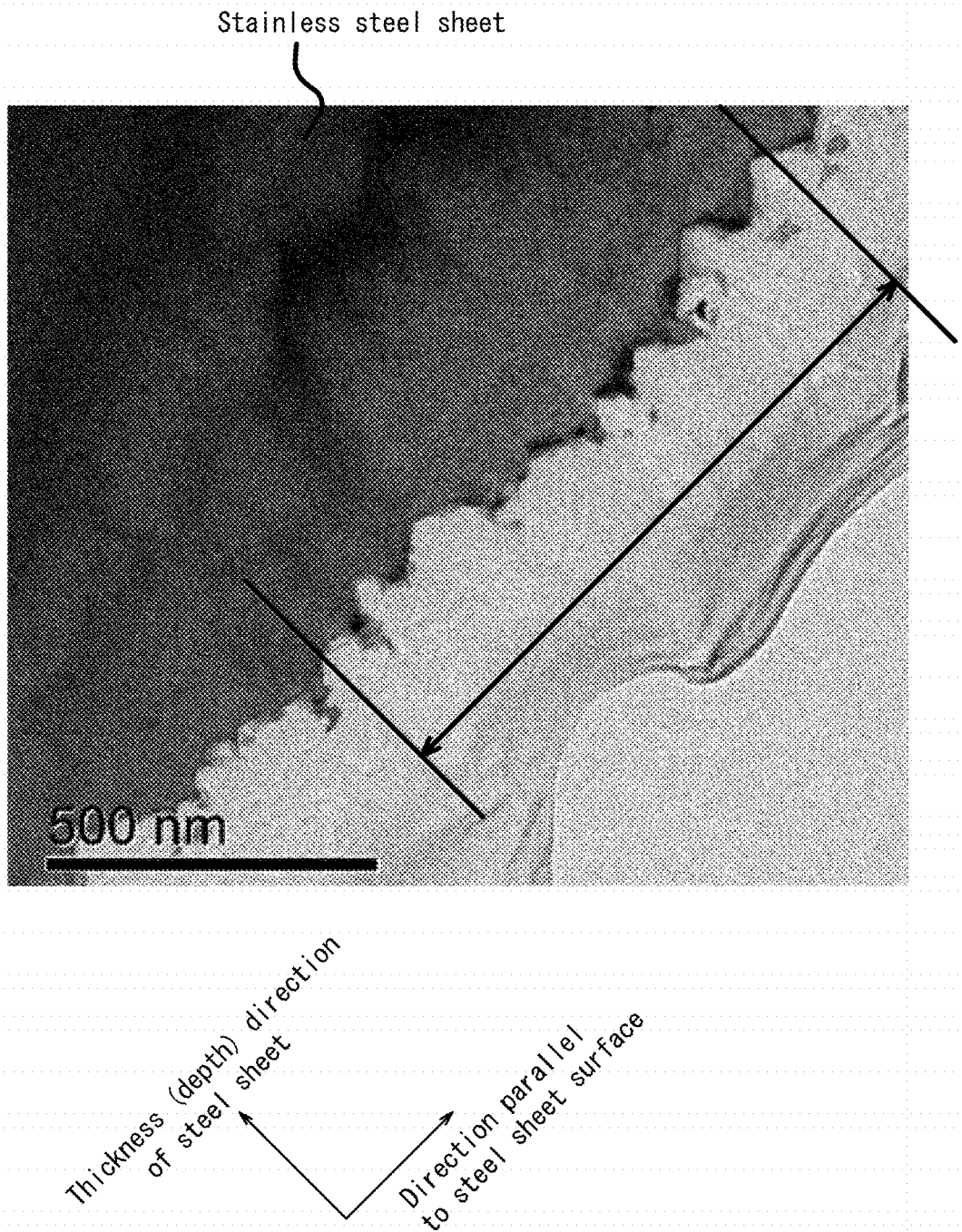
FIG. 1 illustrates an example of a TEM image obtained by observing a section of an austenitic stainless steel sheet for fuel cell separators of an example (sample ID A5)
Figure 2:
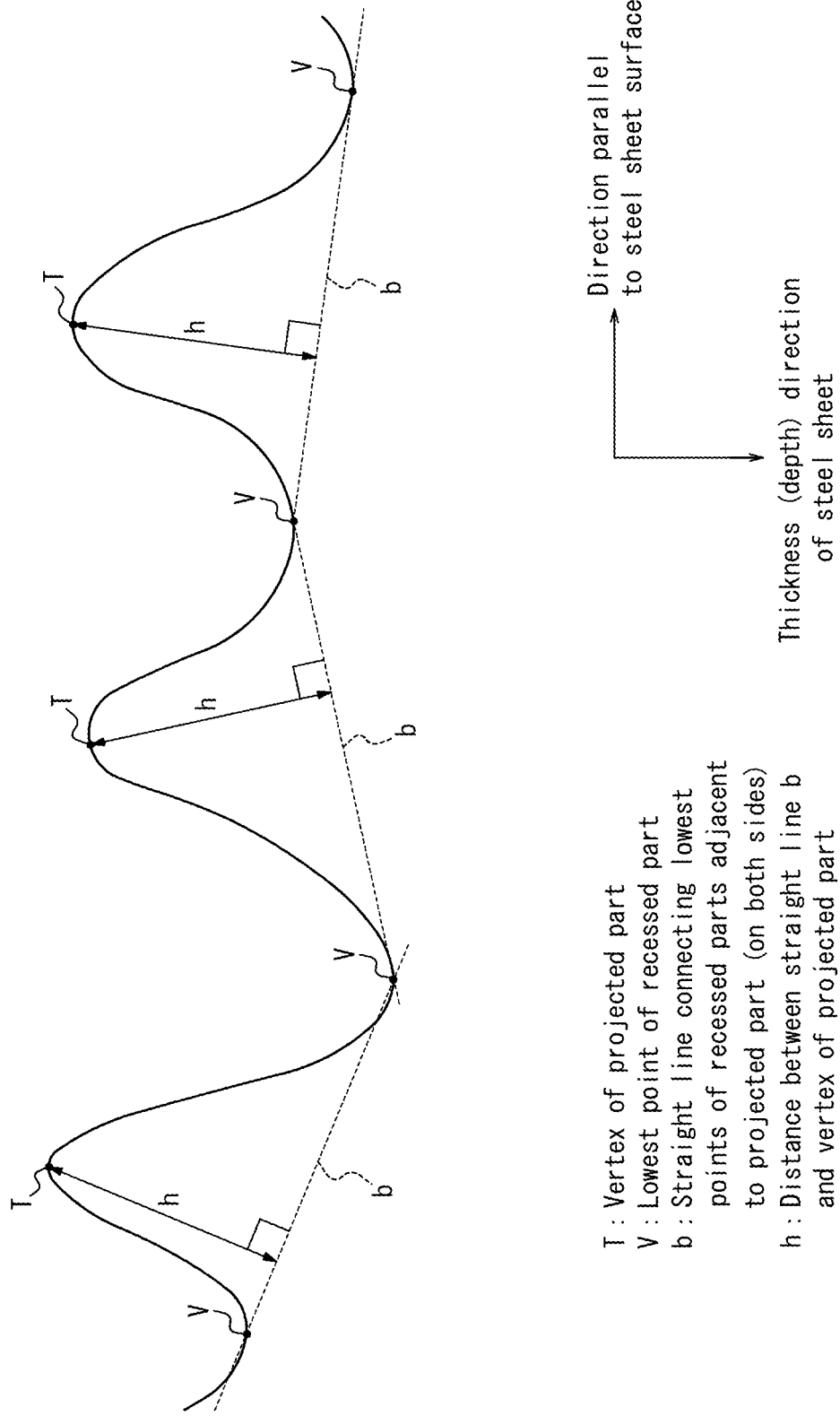
FIG. 2 is a schematic diagram illustrating how to measure the height of each projected part.

In each obtained TEM image as illustrated in FIG. 1, the surface of the steel sheet is checked. As illustrated in FIG. 2, the lowest points V (the lowest points in the thickness (depth) direction of the steel sheet) of the recessed parts adjacent to one projected part (on both sides) are connected with a straight line b, and the distance h between the straight line b and the vertex T (the vertex in the thickness (depth) direction of the steel sheet) of the projected part is calculated. The calculated distance h is taken to be the height of the projected part. The height of each projected part at the surface of the steel sheet observed in each obtained TEM image is determined in this way, and the (arithmetic) average value of the determined heights of the respective projected parts is taken to be the average height of the projected parts.

Each projection with a height of less than 10 nm is not regarded as a projected part, and is excluded from the calculation of the average value.

Average Interval Between Projected Parts: 20 nm or More and 350 nm or Less

The average interval between the projected parts at the surface of the austenitic stainless steel sheet (hereafter also simply referred to as "steel sheet surface") needs to be 20 nm or more and 350 nm or less, in order to achieve low contact resistance.

If the average interval between the projected parts is less than 20 nm, the interval between the recessed parts and the projected parts is excessively narrow. In such a case, sufficient contact between the projected parts at the steel sheet surface and a fuel cell component member such as a gas diffusion layer cannot be achieved, and desired contact resistance cannot be obtained.

If the average interval between the projected parts is more than 350 nm, the recessed parts and the projected parts cannot be finely and densely dispersed at the steel sheet surface. In such a case, sufficient contact area increasing effect cannot be achieved, and desired contact resistance cannot be obtained. Moreover, the dissolution amount and therefore the etching time in the etching treatment increase, which is disadvantageous in terms of productivity.

The average interval between the projected parts is therefore 20 nm or more and 350 nm or less. The average interval between the projected parts is preferably 50 nm or more. The average interval between the projected parts is preferably 300 nm or less.

The average interval between the projected parts is calculated as follows.

In each TEM image obtained as described above, any line segment (length: 1 μm) is drawn in a direction parallel to the steel sheet surface (i.e. a direction orthogonal to the thickness (depth) direction of the steel sheet) as illustrated in FIG. 1, and the number of projected parts (the number of vertices of projected parts) in a projection region of the line segment in the thickness (depth) direction of the steel sheet is measured. The length (1 μm) of the line segment is divided by the number of projected parts, and the result is taken to be the interval between the projected parts. The (arithmetic) average value of the intervals between the projected parts calculated in the respective TEM images is then taken to be the average interval between the projected parts.

Each projection with a height of less than 10 nm is not regarded as a projected part, and is excluded from the measurement of the number of projected parts.

In the austenitic stainless steel sheet for fuel cell separators according to one of the disclosed embodiments, it is important to control the shape of the textured structure at the steel sheet surface and also limit the ratio [Cr]/[Fe] of the atomic concentration of Cr existing in chemical form other than metal to the atomic concentration of Fe existing in chemical form other than metal at the steel sheet surface to 1.0 or more, as mentioned above.

Ratio [Cr]/[Fe] of Atomic Concentration of Cr Existing in Chemical Form Other than Metal to Atomic Concentration of Fe Existing in Chemical Form Other than Metal at Surface of Stainless Steel Sheet: 1.0 or More Excellent resistance to time degradation of contact resistance is obtained by controlling the shape of the textured structure at the steel sheet surface and limiting the ratio (hereafter also denoted by "[Cr]/[Fe]") of the atomic concentration of Cr existing in chemical form other than metal to the atomic concentration of Fe existing in chemical form other than metal at the steel sheet surface to 1.0 or more as mentioned above.

Moreover, the corrosion resistance is improved by increasing the Cr concentration at the steel sheet surface.

[Cr]/[Fe] is therefore 1.0 or more. [Cr]/[Fe] is preferably 1.2 or more.

Higher [Cr]/[Fe] is more advantageous in terms of suppressing the growth of the passive film at the steel sheet surface. Accordingly, no upper limit is placed on [Cr]/[Fe], although [Cr]/[Fe] is preferably 20 or less.

The "chemical form other than metal" denotes oxide and hydroxide chemical form. In detail, for Cr, examples include $CrO_2$, $Cr_2O_3$, $CrOOH$, $Cr(OH)_3$, and $CrO_3$. For Fe, examples include $FeO$, $Fe_3O_4$, $Fe_2O_3$, and $FeOOH$.

[Cr]/[Fe] can be determined as follows.

The peaks of Cr and Fe measured by X-ray photoelectron spectroscopy (hereafter also referred to as "XPS") are separated into the peaks of Cr and Fe existing in metal form and the peaks of Cr and Fe existing in chemical form other than metal. From the intensities of the respective peaks, the atomic concentration of Cr existing in chemical form other than metal and the atomic concentration of Fe existing in chemical form other than metal are calculated. Dividing the atomic concentration of Cr existing in chemical form other than metal by the atomic concentration of Fe existing in chemical form other than metal yields [Cr]/[Fe].

Specifically, a sample of 10 mm square is cut out of the steel sheet, and measured by an X-ray photoelectron spectrometer (X-tool produced by ULVAC-PHI, Inc.) with an extraction angle of 45 degrees using a Al—Kα monochromatic X-ray source. The peaks of Cr and Fe are separated into the peaks of Cr and Fe existing in metal form and the peaks of Cr and Fe existing in chemical form other than metal. Following this, from the intensities of the respective peaks, the atomic concentration of Cr existing in chemical form other than metal and the atomic concentration of Fe existing in chemical form other than metal are calculated. Dividing the atomic concentration of Cr existing in chemical form other than metal by the atomic concentration of F e existing in chemical form other than metal yields [Cr]/[Fe].

Peak separation is performed by removing the background of the spectrum by Shirley method and using a Gauss-Lorentz complex function (proportion of Lorentz function: 30%).

Atomic Concentration of N Existing at Steel Sheet Surface: 1.0 at % or More

By increasing the nitrogen concentration at the steel sheet surface, the corrosion resistance in the use environment of fuel cell separators can be further improved.

In detail, by introducing nitrogen into the surface layer of the steel sheet, nitrides having excellent corrosion resistance are formed in the surface layer of the steel sheet. This improves the barrier property of the steel sheet surface, and improve the corrosion resistance and particularly the pitting corrosion resistance. Herein, the nitrides are nitrides of elements contained in the chemical composition of the stainless steel sheet, and are mainly made up of Cr nitride, Si nitride, Al nitride, and mixtures thereof. An increase in the amount of solute nitrogen as a result of introducing nitrogen into the surface layer of the steel sheet also contributes to improved corrosion resistance and particularly improved pitting corrosion resistance.

The atomic concentration of N existing at the steel sheet surface is therefore preferably 1.0 at % or more. The atomic concentration of N existing at the steel sheet surface is more preferably 3.0 at % or more.

If the atomic concentration of N existing at the steel sheet surface is more than 20.0 at %, the nitrides form in large amount inside the steel sheet, too, and may become a crack origin when the steel sheet is worked into a separator shape. The atomic concentration of N existing at the steel sheet surface is therefore preferably 20.0 at % or less.

The atomic concentration of N existing at the steel sheet surface is determined by XPS.

Specifically, a sample of 10 mm square is cut out of the steel sheet, and measured by an X-ray photoelectron spectrometer (X-tool produced by ULVAC-PHI, Inc.) with an extraction angle of 45 degrees using a Al-Kα monochromatic X-ray source. The atomic numbers (ratios) of main elements, e.g. N, Al, Si, Cr, Mn, Fe, Ni, Cu, Mo, Ti, Nb, and Zr, contained in the steel sheet (i.e. the peak intensities (ratios) of these elements) are then calculated. The atomic number (ratio) of N is divided by the total atomic number (ratio) of these elements and the result is multiplied by 100, thus calculating the atomic concentration (at %) of N existing at the steel sheet surface.

In the measurement, the peaks of C and O may be detected, too. However, the peak intensities (ratios) of C and O are excluded from the calculation because impurities at the steel sheet surface may have particularly significant influence on the peak intensities (ratios) of C and O.

In the case of performing etching treatment on the surface using a hydrofluoric acid aqueous solution, fluorine is incorporated into the surface layer of the steel sheet. Hence, typically F is detected (the peak of F is observed) when the steel sheet surface is measured by XPS.

On the other hand, the austenitic stainless steel sheet for fuel cell separators according to one of the disclosed embodiments is produced using a treatment solution in which the concentration of hydrofluoric acid is minimized, so that F is not detected when the steel sheet surface is measured by XPS. Thus, in the austenitic stainless steel sheet for fuel cell separators according to one of the disclosed embodiments, the peak of F is not observed even when its surface is measured by XPS.

As the austenitic stainless steel sheet, for example, SUS304 and SUS316L defined in JIS G 4305 are preferable.

The chemical composition of the austenitic stainless steel sheet is not limited, but the austenitic stainless steel sheet preferably has a chemical composition containing, in mass %, C: 0.100% or less, Si: 2.00% or less, Mn: 3.00% or less, P: 0.050% or less, S: 0.010% or less, Cr: 15.0% to 40.0%, Ni: 5.0% to 30.0%, Al: 0.500% or less, and N: 0.100% or less, and optionally containing, in mass %, one or more selected from (a) Cu: 2.50% or less, (b) Mo: 4.00% or less, and (c) one or more element selected from Ti, Nb, and Zr: 1.00% or less in total, with the balance consisting of Fe and inevitable impurities.

The reason for this will be explained below. In the following description, "%" regarding the chemical composition denotes mass % unless otherwise stated.

C: 0.100% or Less

C reacts with Cr in the steel and precipitates as Cr carbide in grain boundaries, thus causing a decrease in corrosion resistance. Therefore, less C is desirable in terms of corrosion resistance, and the C content is preferably 0.100% or less. The C content is more preferably 0.060% or less. No lower limit is placed on the C content, yet the lower limit is preferably 0.001%.

Si: 2.00% or Less

Si is an element effective for deoxidation, and is added at the stage of steelmaking for the steel. To achieve this effect, the Si content is preferably 0.01% or more. Excessively containing Si, however, hardens the stainless steel, as a result of which the ductility tends to decrease. Therefore, the Si content is preferably 2.00% or less. The Si content is more preferably 1.00% or less.

Mn: 3.00% or Less

Mn is an element effective for deoxidation, and is added at the stage of steelmaking for the steel. To achieve this effect, the Mn content is preferably 0.01% or more. If the Mn content is more than 3.00%, the corrosion resistance tends to decrease. Therefore, the Mn content is preferably 3.00% or less. The Mn content is more preferably 1.50% or less, and further preferably 1.00% or less.

P: 0.050% or Less

P decreases the ductility, and thus the P content is desirably low. If the P content is 0.050% or less, the ductility does not decrease markedly. Therefore, the P content is preferably 0.050% or less. The P content is more preferably 0.040% or less. No lower limit is placed on the P content, yet the P content is preferably 0.010% or more because excessive dephosphorization incurs higher cost.

S: 0.010% or Less

S is an element that combines with Mn to form MnS and thus decreases the corrosion resistance. If the S content is 0.010% or less, the corrosion resistance does not decrease markedly. Therefore, the S content is preferably 0.010% or less. No lower limit is placed on the S content, yet the S content is preferably 0.001% or more because excessive desulfurization incurs higher cost.

Cr: 15.0% to 40.0%

The Cr content is preferably 15.0% or more in order to ensure the corrosion resistance. If the Cr content is less than 15.0%, the stainless steel sheet has difficulty in withstanding long-term use as fuel cell separators in terms of the corrosion resistance. The Cr content is preferably 18.0% or more. If the Cr content is more than 40.0%, the ductility may decrease. Therefore, the Cr content is preferably 40.0% or less. The Cr content is more preferably 30.0% or less. The Cr content is further preferably 20.0% or less.

Ni: 5.0% to 30.00%

Ni is an element that facilitates the formation of austenite phase. To achieve this effect, the Ni content is preferably 5.0% or more. The Ni content is preferably 7.5% or more. The Ni content is further preferably 12.0% or more. If the Ni content is more than 30.00%, the hot workability decreases. Therefore, the Ni content is preferably 30.00% or less. The Ni content is more preferably 20.00% or less. The Ni content is further preferably 15.00% or less.

Al: 0.500% or Less

Al is an element used for deoxidation. To achieve this effect, the Al content is preferably 0.001% or more. If the Al content is more than 0.500%, the ductility may decrease. Therefore, the Al content is preferably 0.500% or less. The Al content is more preferably 0.010% or less, and further preferably 0.005% or less.

N: 0.100% or Less

If the N content is more than 0.100%, the formability decreases. Therefore, the N content is preferably 0.100% or less. The N content is more preferably 0.050% or less. The N content is further preferably 0.030% or less. No lower limit is placed on the N content, yet the N content is preferably 0.002% or more because excessive denitriding incurs higher cost.

In addition to the components described above, the chemical composition may contain the following components.

Cu: 2.50% or Less

Cu is an element effective for facilitating the formation of austenite phase and improving the corrosion resistance of the stainless steel. To achieve this effect, the Cu content is preferably 0.01% or more. If the Cu content is more than 2.50%, the hot workability decreases, which leads to a decrease in productivity. Accordingly, in the case of containing Cu, the Cu content is 2.50% or less. The Cu content is preferably 1.00% or less.

Mo: 4.00% or Less

Mo is an element effective for preventing local corrosion such as crevice corrosion of the stainless steel. To achieve this effect, the Mo content is preferably 0.01% or more. If the Mo content is more than 4.00%, the stainless steel embrittles. Accordingly, in case of containing Mo, the Mo content is 4.00% or less. The Mo content is preferably 2.50% or less.

One or More Elements Selected from Ti, Nb, and Zr: 1.00% or Less in Total

Ti, Nb, and Zr contribute to improved intergranular corrosion resistance, and therefore these elements can be contained alone or in combination. To achieve this effect, the content of each element is preferably 0.01% or more. If the total content of these elements is more than 1.00%, however, ductility tends to decrease. Accordingly, in the case of containing any of Ti, Nb, and Zr, the total content of these elements is 1.00% or less. No lower limit is placed on the total content of Ti, Nb, and Zr, yet the total content of Ti, Nb, and Zr is preferably 0.01% or more.

The components other than those described above consist of Fe and inevitable impurities.

In terms of the fuel cell stack installation space and weight, the sheet thickness of the stainless steel sheet is preferably in a range of 0.03 mm to 0.30 mm. If the sheet thickness is less than 0.03 mm, the production efficiency of the metal sheet material decreases. If the sheet thickness is more than 0.30 mm, the stack installation space and weight increase. The sheet thickness is more preferably 0.05 mm or more. The sheet thickness is more preferably 0.15 mm or less.

(2) Production Method for Austenitic Stainless Steel Sheet for Fuel Cell Separators A production method for an austenitic stainless steel sheet for fuel cell separators according to one of the disclosed embodiments will be described below.

Preparation

Preparation involves preparing an austenitic stainless steel sheet as a material (hereafter also referred to as "blank austenitic stainless steel sheet"). The blank austenitic stainless steel sheet is not limited as long as it has the above-described chemical composition.

For example, an austenitic stainless steel sheet having the above-described chemical composition can be prepared by hot rolling a steel slab having the above-described chemical composition to obtain a hot-rolled sheet, optionally subjecting the hot-rolled sheet to hot-rolled sheet annealing, and thereafter cold rolling the hot-rolled sheet to obtain a cold-rolled sheet with a desired sheet thickness. Further, cold-rolled sheet annealing may be optionally added between cold rolling operations, as intermediate annealing.

The conditions of the hot rolling, the cold rolling, the hot-rolled sheet annealing, the cold-rolled sheet annealing, and the like are not limited, and may comply with conventional methods. After the cold-rolled sheet annealing, the stainless steel sheet may be subjected to pickling and skin pass.

The cold-rolled sheet annealing may be bright annealing.

Heat Treatment

The blank austenitic stainless steel sheet prepared in the above-described manner is preferably subjected to heat treatment (before the below-described oxide layer removal treatment), under the conditions of a treatment atmosphere having a nitrogen concentration of 5 vol % or more and a dew point of −45° C. or less, a maximum temperature of 1000° C. or more and 1200° C. or less, and a residence time in a temperature range of 1000° C. or more of 1 sec or more and 300 sec or less.

By this heat treatment, nitrogen can be introduced into the surface layer of the blank austenitic stainless steel sheet. Consequently, in the austenitic stainless steel sheet for fuel cell separators as a finished product, the corrosion resistance and particularly the pitting corrosion resistance in the use environment of fuel cell separators is improved.

Treatment Atmosphere: Nitrogen Concentration of 5 Vol % or More and Dew Point of −45° C. or Less As a result of the nitrogen concentration in the treatment atmosphere being 5 vol % or more, nitrogen can be effectively introduced into the surface layer of the blank austenitic stainless steel sheet. Therefore, the nitrogen concentration in the treatment atmosphere is preferably 5 vol % or more. The nitrogen concentration in the treatment atmosphere is more preferably 10 vol % or more, and further preferably 20 vol % or more.

Atmosphere gas other than nitrogen is preferably one or more selected from hydrogen, helium, argon, neon, carbon monoxide, and carbon dioxide. If the dew point of the treatment atmosphere is high, oxides form at the surface of the blank austenitic stainless steel sheet during the heat treatment, making it difficult to introduce nitrogen into the surface layer of the steel sheet. As a result of the dew point of the treatment atmosphere being −45° C. or less, nitrogen can be effectively introduced into the surface layer of the blank austenitic stainless steel sheet. Therefore, the dew point of the treatment atmosphere is preferably −45° C. or less. The dew point of the treatment atmosphere is more preferably −50° C. or less. The dew point of the treatment atmosphere is further preferably −65° C. or less.

Maximum Temperature: 1000° C. or More and 1200° C. or Less

If the maximum temperature in the heat treatment is less than 1000° C., nitrogen cannot be sufficiently introduced into the surface layer of the blank austenitic stainless steel sheet. Moreover, the rolled microstructure of the blank austenitic stainless steel sheet (cold-rolled sheet) cannot be sufficiently recrystallized, which may lead to degraded workability.

If the maximum temperature is more than 1200° C., crystal grains coarsen, which may lead to degraded workability. Moreover, if nitrogen considerably exceeding the solid solubility limit is introduced, the nitrogen forms nitrides that precipitate not only on the steel sheet surface but also inside the steel sheet. This may lead to degraded corrosion resistance and workability.

Therefore, the maximum temperature in the heat treatment is preferably 1000° C. or more and 1200° C. or less. The maximum temperature in the heat treatment is more preferably 1050° C. or more. The maximum temperature in the heat treatment is more preferably 1150° C. or less.

Residence Time in Temperature Range of 1000° C. or More: 1 Sec or More and 300 Sec or Less If the residence time in a temperature range of 1000° C. or more in the heat treatment is less than 1 sec, nitrogen cannot be sufficiently introduced into the surface layer of the blank austenitic stainless steel sheet. Moreover, the rolled microstructure of the blank austenitic stainless steel sheet (cold-rolled sheet) cannot be sufficiently recrystallized, which may lead to degraded workability.

If the residence time in a temperature range of 1000° C. or more in the heat treatment is more than 300 sec, crystal grains coarsen, which may lead to degraded workability. Moreover, if nitrogen considerably exceeding the solid solubility limit is introduced, the nitrogen forms nitrides that precipitate not only on the steel sheet surface but also inside the steel sheet. This may lead to degraded corrosion resistance and workability.

Therefore, the residence time in a temperature range of 1000° C. or more in the heat treatment is preferably 1 sec or more and 300 sec or less. The residence time is more preferably 3 sec or more, and further preferably 5 sec or more. The residence time is more preferably 120 sec or less, and further preferably 60 sec or less.

In the above-described heat treatment, nitrogen is introduced into the surface layer of the blank austenitic stainless steel sheet, specifically, from the surface of the steel sheet to a depth of about several tens of μm.

Hence, even when the oxide layer is removed in the oxide layer removal treatment and stainless steel sheet base metal of about several μm in thickness is dissolved in the etching treatment described below, a high atomic concentration of N existing at the steel sheet surface is maintained in the finished product.

Removal of Oxide Layer

Next, an oxide layer formed at the surface of the blank austenitic stainless steel sheet beforehand (hereafter also simply referred to as "oxide layer") is removed. By removing the oxide layer before the below-described etching treatment, stable contact resistance reduction effect by the etching treatment in the active region is achieved.

The oxide layer formed beforehand is, for example, a passive film formed in the air or a layer formed during annealing in the production of the blank austenitic stainless steel sheet.

The oxide layer may be removed by anodic electrolysis, cathodic electrolysis, or a combination of anodic electrolysis and cathodic electrolysis. Of these, cathodic electrolysis is preferable. Cathodic electrolysis is particularly advantageous because the amount of the stainless steel sheet base metal dissolved is reduced as compared with anodic electrolysis.

The treatment conditions of cathodic electrolysis are set to have such current density that can remove the oxide layer at the surface of the stainless steel sheet. Specifically, the electrolysis conditions are preferably adjusted in each case depending on the steel type of the stainless steel sheet, the thickness of the oxide layer formed beforehand, and the structure of the electrolysis apparatus, etc.

For example, in the case of potential control, cathodic electrolysis can be performed under the conditions of potential: −0.7 V (vs. Ag/AgCl) and treatment time: 1 min or more in a 30 g/L sulfuric acid aqueous solution. Herein, V (vs. Ag/AgCl) is the potential relative to a silver-silver chloride electrode used as a reference electrode, which is expressed as (vs. Ag/AgCl).

In the case of current control, the conditions are preferably adjusted in a range of current density: −0.1 mA/cm² to −100 mA/cm² and treatment time: 1 sec to 600 sec, although depending on the steel type and the thickness of the oxide layer. In particular, while the treatment time depends on the current density, for example in the case of current density: −0.5 mA/cm², the oxide layer at the surface of the stainless steel sheet is typically removed with a treatment time of 60 sec or more. If the treatment time increases, economic efficiency decreases. The treatment time is therefore preferably 600 sec or less. The treatment time is more preferably 300 sec or less.

The "current density" herein denotes a value obtained by dividing the current flowing between the stainless steel sheet as the material to be treated and the counter electrode by the surface area of the material to be treated. In current control, this current density is controlled.

The treatment solution used in the cathodic electrolysis is not limited, but a sulfuric acid aqueous solution is preferable.

The concentration of the treatment solution is adjusted so that the treatment solution will have sufficiently high conductivity. For example, in the case of a sulfuric acid aqueous solution, the concentration of sulfuric acid is preferably about 10 g/L to 100 g/L.

When using an inexpensive acid such as a regenerated acid, other acids such as hydrofluoric acid and phosphoric acid are contained as impurities in some cases. Allowable concentration of acids other than sulfuric acid is 5 g/L or less. Here, the concentration of hydrofluoric acid needs to be infinitesimal, specifically 1 g/L or less, in terms of safety during treatment and safety of disposal of waste liquid discharged after treatment. The concentration of acids other than sulfuric acid may be 0 g/L.

The treatment temperature is not limited, but is preferably 30° C. to 85° C.

Using the same treatment solution for the oxide layer removal and the below-described etching treatment is advantageous cost-wise. Moreover, the oxide layer removal and the etching treatment can be continuously performed in the same electrolytic bath, depending on the structure of the electrolytic bath.

Etching Treatment

The blank austenitic stainless steel sheet from which the oxide layer at the surface has been removed by the foregoing oxide layer removal treatment is subjected to etching treatment in the active region of the blank austenitic stainless steel sheet.

It is very important to control the dissolution amount to a range of 1.0 g/m² to 20.0 g/m² in the etching treatment.

Dissolution Amount in Etching Treatment: 1.0 g/m² to 20.0 g/m²

By controlling the dissolution amount in the etching treatment to 1.0 g/m² or more, a predetermined textured structure can be formed at the surface of the stainless steel sheet, in particular, the average height of the projected parts can be controlled to a predetermined height. This enhances the resistance to time degradation of contact resistance. The dissolution amount in the etching treatment is therefore 1.0 g/m² or more. The dissolution amount in the etching treatment is preferably 3.0 g/m² or more.

If the dissolution amount in the etching treatment is more than 20.0 g/m², the average interval between the projected parts is excessively large, and a predetermined contact resistance cannot be obtained. Moreover, smut firmly attaches to the steel sheet surface, and is hard to be removed even by the below-described treatment in an acid solution. This causes an increase in contact resistance. The dissolution amount in the etching treatment is therefore 20.0 g/m² or less. The dissolution amount in the etching treatment is preferably 10.0 g/m² or less.

The dissolution amount in the etching treatment is calculated by dividing the difference in the mass of the blank austenitic stainless steel sheet between before and after the etching treatment by the area of the surface of the blank austenitic stainless steel sheet (area per both sides).

For etching treatment on a stainless steel sheet, there are three potential ranges in which the etching treatment can be performed, namely, an active region, a passive region, and a transpassive region. The reason for employing the etching treatment in the active region in this embodiment is as follows.

In the case where the etching treatment is performed in the passive region, a passive film forms on the stainless steel sheet, as a result of which sufficient etching effect cannot be achieved and desired contact resistance reduction effect cannot be achieved.

In the case where the etching treatment is performed in the transpassive region, the stainless steel sheet dissolves in a large amount, and its dissolution rate is high. Accordingly, etching progresses rapidly, and desired contact resistance reduction effect cannot be achieved. In addition, since there is a possibility that an oxygen evolution reaction occurs simultaneously depending on the potential, the control of the etching amount is difficult.

In the case where the etching treatment is performed in the active region, sufficient etching effect is achieved as compared with the etching treatment in the passive region. Moreover, the amount of the stainless steel sheet dissolved is small and is easy to control as compared with the etching treatment in the transpassive region.

Thus, with the etching treatment in the active region, the amount of the stainless steel sheet dissolved can be accurately controlled, with it being possible to control the shape of the fine textured structure formed at the steel sheet surface on the order of nm. For this reason, the etching treatment in the active region is employed in this embodiment.

The dissolution amount in the etching treatment can be controlled by appropriately adjusting the temperature and/or the concentration (for example, the sulfuric acid concentration in the case of using a sulfuric acid aqueous solution as the treatment solution) of the treatment solution used in the etching treatment, and/or the treatment time in the etching treatment.

The three potential ranges of the active region, the passive region, and the transpassive region are defined as follows.

Figure 3:
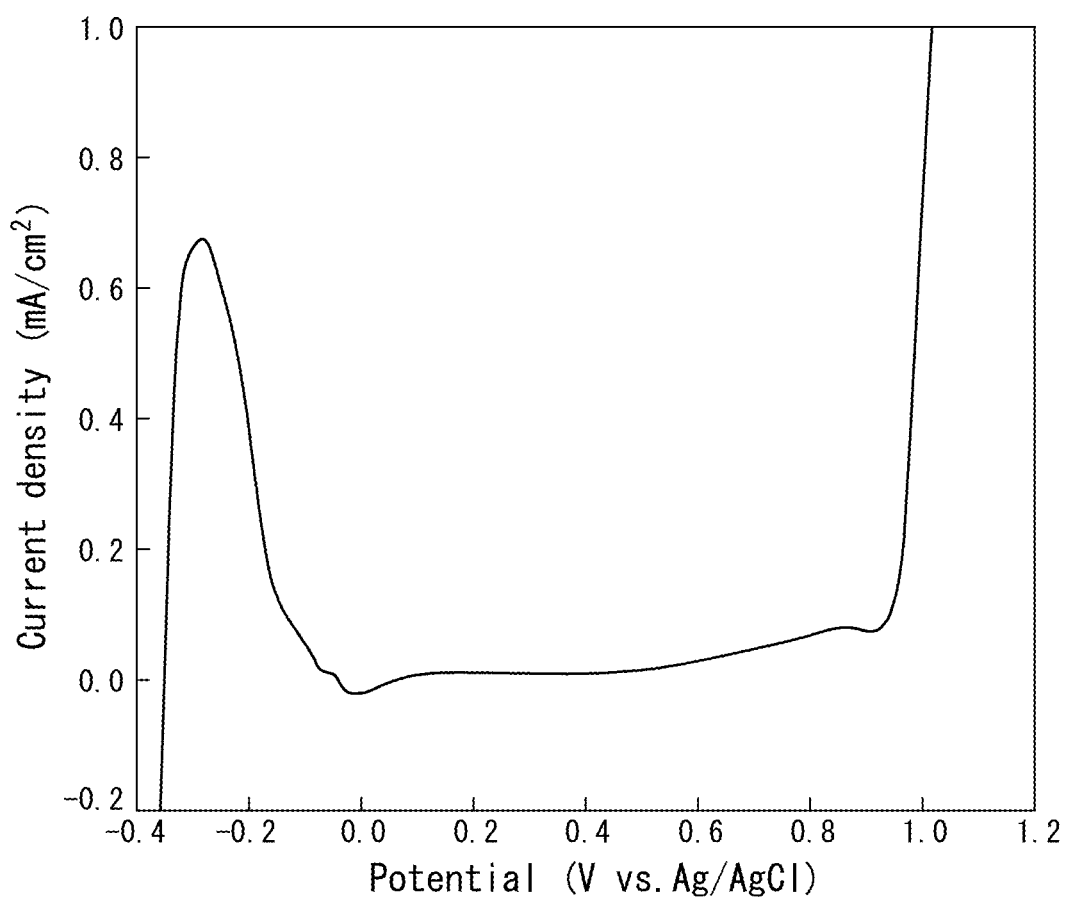
FIG. 3 is a diagram illustrating an example of an anodic polarization curve.

As illustrated in FIG. 3, in the case where a stainless steel sheet having the chemical composition of steel sample ID A in Table 1 is polarized in an anodic direction from a natural immersion potential, the current, i.e. the current density, increases from when the potential exceeds −0.35 V (vs. Ag/AgCl), and reaches a local maximum value of about +0.67 mA/cm². After this, the current decreases as the potential increases, and, when the potential reaches −0.11 V (vs. Ag/AgCl), the current density decreases to less than or equal to 1/10 of the local maximum value. This low current state continues in a potential range from −0.11 V (vs. Ag/AgCl) to +0.78 V (vs. Ag/AgCl). After this, the current density rapidly increases again as the potential increases.

FIG. 3 illustrates an anodic polarization curve obtained for steel sample ID A in Table 1 at a potential scanning rate of 1 mV/s after performing cathodic electrolysis with −0.7 V (vs. Ag/AgCl) for 1 min at 55° C. in a 30 g/L sulfuric acid aqueous solution using a silver-silver chloride electrode as a reference electrode. This potential scanning rate is used when obtaining an anodic polarization curve.

The potential range in which the current density increases with the initial potential increase is the active region, the potential range in which current hardly flows and the current density remains low even when the potential increases is the passive region, and the potential range in which the current density rapidly increases over the potential range of the passive region is the transpassive region.

Specifically, the active region is defined as a potential range that, in an anodic polarization curve obtained when polarizing a stainless steel sheet in a treatment solution in an anodic direction from a natural immersion potential at a scanning rate of 1 mV/s, appears first with potential increase (before the passive region is reached) and in which the current density increases as the potential increases and reaches a local maximum value (the maximum value of the current density in the active region) and then decreases to less than or equal to $1/10$ of the local maximum value.

The passive region is defined as a potential range in which, in the anodic polarization curve, current hardly flows even when the potential increases over the active region (specifically, a potential range in which the current density is maintained at less than or equal to $1/10$ of the local maximum value).

The transpassive region is defined as a potential range in which the current rapidly increases as the potential increases over the passive region.

The active region varies depending on the steel type of the stainless steel sheet, the treatment solution used, and the like. It is therefore preferable to acquire an anodic polarization curve in accordance with these conditions beforehand to determine the potential range of the active region and perform electrolytic etching treatment.

Specifically, in the case of performing etching treatment by potential control, the anodic polarization curve of the stainless steel sheet as the material to be treated is acquired beforehand to determine the potential range of the active region and perform etching treatment in the potential range.

For example, in the case of treating steel sample ID A in Table 1 in a 30 g/L sulfuric acid aqueous solution, a potential range of −0.35 V to −0.10 V (vs. Ag/AgCl) corresponds to the active region. Accordingly, etching treatment is performed in the potential range of the active region with the treatment time adjusted in a range of 1 sec to 600 sec as appropriate.

In the case of performing etching treatment by current control, the relationship between the current density and the electrolytic potential is studied beforehand to determine the range of current density in which the stainless steel sheet is electrolyzed in the active region and perform etching in the range of current density.

In current control, adjustment is needed in each case because appropriate current density varies depending on the steel type of the stainless steel sheet, the treatment solution used, and the like.

In a plant with a large-size electrolysis apparatus, such as when the material to be treated is large or a steel sheet in a coil state is subjected to etching treatment, it is difficult to use a reference electrode. In such a case, the relationship between the current density and the electrolytic voltage applied between the stainless steel sheet as the material to be treated and the counter electrode may be studied while increasing the current density, to determine current density with which the stainless steel sheet is etched in the potential range of the active region. Then, etching treatment may be performed with the current density corresponding to the potential range of the active region.

Specifically, current density until the electrolytic voltage applied between the stainless steel sheet as the material to be treated and the counter electrode rapidly increases can be determined to correspond to the active region, and current density after the electrolytic voltage applied between the stainless steel sheet as the material to be treated and the counter electrode rapidly increases can be determined to correspond to the transpassive region.

For example, in the case of treating steel sample ID A in Table 1 using a 30 g/L sulfuric acid aqueous solution, by controlling the current density to about 0.01 mA/cm$^2$ to 1.00 mA/cm$^2$, the steel can be electrolyzed in the potential range corresponding to the active region. Hence, electrolytic etching treatment is performed in the current density range corresponding to the active region, with the treatment time being appropriately adjusted in a range of 1 sec to 600 sec.

The "current density" herein denotes a value obtained by dividing the current flowing between the stainless steel sheet as the material to be treated and the counter electrode by the surface area of the material to be treated. In current control, this current density is controlled.

The treatment solution used in the electrolytic etching treatment is preferably a sulfuric acid aqueous solution.

The concentration of the treatment solution is adjusted so that the treatment solution has sufficiently high conductivity. For example, in the case of a sulfuric acid aqueous solution, the concentration of sulfuric acid is preferably about 10 g/L to 300 g/L. From the viewpoint of controlling the dissolution amount in the etching treatment to a range of 1.0 g/m$^2$ to 20.0 g/m$^2$, the concentration of sulfuric acid is preferably 30 g/L or more, and more preferably 60 g/L or more.

The treatment solution may contain a small amount of nitric acid, for purposes such as removal of smut formed at the surface of the stainless steel. However, nitric acid passivates the stainless steel and reduces the etching effect. The concentration of nitric acid is therefore preferably 10 g/L or less. In the case of adding nitric acid to a sulfuric acid aqueous solution, the concentration of nitric acid is preferably less than or equal to the concentration of sulfuric acid. The concentration of nitric acid may be 0 g/L.

Acids other than the foregoing sulfuric acid and nitric acid are preferably reduced as much as possible. When using an inexpensive acid such as a regenerated acid, however, other acids such as hydrofluoric acid and phosphoric acid are contained as impurities in some cases. Allowable concentration of acids other than sulfuric acid and nitric acid is 5 g/L or less. Here, the concentration of hydrofluoric acid needs to be infinitesimal, specifically 1 g/L or less, in terms of safety during treatment and safety of disposal of waste liquid discharged after treatment. The concentration of acids other than sulfuric acid may be 0 g/L.

The treatment temperature is not limited, but is preferably 30° C. to 85° C. In particular, from the viewpoint of controlling the dissolution amount in the etching treatment to a range of 1.0 g/m$^2$ to 20.0 g/m$^2$, the treatment temperature is more preferably 60° C. or more. The treatment temperature is further preferably 70° C. or more, and still further preferably 75° C. or more.

In the case where the oxide layer removal treatment and the electrolytic etching treatment can be performed with the same treatment solution and the same treatment temperature, the stainless steel sheet may be continuously treated using the same electrolytic bath.

Immersion in Oxidizing Solution, or Electrolysis in Passive Region of Blank Austenitic Stainless Steel Sheet To improve the resistance to time degradation of contact resistance, it is important to further subject the blank austenitic stainless steel sheet on which the foregoing etching treatment has been performed, to immersion in an oxidizing solution or electrolysis in the passive region of the blank austenitic stainless steel sheet (hereafter also referred to as "immersion in an oxidizing solution or electrolysis"). This increases the Cr concentration at the steel sheet surface, and minimizes the thickening of the passive film when storing the stainless steel sheet in the air.

It is also important to dissolve (remove) attached matter such as smut formed during the etching treatment, by the immersion in an oxidizing solution or electrolysis.

In detail, in the austenitic stainless steel sheet for fuel cell separators according to one of the disclosed embodiments, a sufficient height difference between the recessed and projected parts in the textured structure at the steel sheet surface needs to be ensured, as mentioned above. Hence, the dissolution amount in the etching treatment for forming the textured structure at the steel sheet surface needs to be large, specifically, 1.0 g/m² or more. However, if the dissolution amount in the etching treatment is large, a large amount of smut (a mixture mainly composed of C, N, S, O, Fe, Cr, and Ni and having high electric resistance) forms at the surface of the stainless steel sheet after the etching treatment. Due to such smut, the steel sheet as etched has high contact resistance. As a result of performing the immersion in an oxidizing solution or electrolysis after the etching treatment to increase the Cr concentration at the steel sheet surface, i.e. increase [Cr]/[Fe], smut is removed and low contact resistance is obtained. Without the immersion in an oxidizing solution or electrolysis after the etching treatment, not only the resistance to time degradation of contact resistance is insufficient, but also low contact resistance cannot be obtained due to smut.

Examples of the oxidizing solution include a nitric acid aqueous solution and a hydrogen peroxide aqueous solution. A longer immersion time facilitates the removal of smut and the like and the condensation of Cr at the surface. However, if the immersion time is excessively long, the effect is saturated and productivity decreases. Accordingly, the treatment time in the immersion is preferably 2 hr (120 min) or less. The treatment time in the immersion is more preferably 15 min or less. The treatment time in the immersion is preferably 0.5 min or more. The treatment time in the immersion is more preferably 1 min or more.

In the case of using a nitric acid aqueous solution, the concentration of nitric acid is preferably 10 g/L to 400 g/L. In the case of using a hydrogen peroxide aqueous solution, the concentration of hydrogen peroxide is preferably 10 g/L to 300 g/L. Allowable concentration of acids contained in each treatment solution as impurities is 10 g/L or less. No lower limit is placed on the concentration of acids contained in each treatment solution as impurities, and the concentration may be 0 g/L. Here, the concentration of hydrofluoric acid needs to be infinitesimal, specifically 1 g/L or less, in terms of safety during treatment and safety of disposal of waste liquid discharged after treatment.

The treatment temperature in the immersion in an oxidizing solution is not limited, but is preferably 30° C. to 60° C.

In the electrolysis, the potential is adjusted to such a potential range in which the stainless steel sheet is passivated. In particular, it is preferable to adjust the potential to such a potential range in which components such as Fe and Ni other than Cr in the steel are dissolved and Cr is not dissolved.

The potential range (passive region) in which the stainless steel sheet is passivated differs depending on the treatment solution (electrolytic solution) used and the steel type of the stainless steel sheet as the material to be treated. It is therefore preferable to adjust the potential in the electrolysis for each treatment solution and each steel type of stainless steel. For example, in the case of using a 50 g/L nitric acid aqueous solution to treat steel sample ID A in Table 1, electrolysis is preferably performed in a potential range of +0.40 V to +0.60 V (vs. Ag/AgCl). A longer treatment time facilitates the condensation of Cr existing in chemical form other than metal at the steel sheet surface. However, if the treatment time is excessively long, the effect is saturated and the productivity decreases. Accordingly, the electrolysis time is preferably 2 hr (120 min) or less. The electrolysis time is more preferably 15 min or less. The electrolysis time is preferably 0.5 min or more. The electrolysis time is more preferably 1 min or more.

The treatment temperature in the electrolysis is not limited, but is preferably 30° C. to 70° C.

In the immersion in an oxidizing solution or the electrolysis in the passive region of the blank austenitic stainless steel sheet, the surface of the stainless steel sheet to be treated may be optionally rubbed using a nonwoven fabric wiper or the like. This facilitates the removal of smut and the like, and thus enhances the contact resistance reduction effect.

Others

After the immersion in an oxidizing solution or the electrolysis in the passive region of the blank austenitic stainless steel sheet, a surface-coating layer may be formed at the surface of the steel sheet.

The surface-coating layer formed is not limited, but it is preferable to use a material having excellent corrosion resistance and conductivity in a use environment of fuel cell separators. For example, a metal layer, an alloy layer, a metal oxide layer, a metal carbide layer, a metal nitride layer, a carbon material layer, a conductive polymer layer, an organic resin layer containing a conductive substance, or a mixed layer thereof is suitable.

Examples of the metal layer include metal layers of Au, Ag, Cu, Pt, Pd, W, Sn, Ti, Al, Zr, Nb, Ta, Ru, Ir, and Ni. A metal layer of Au or Pt is particularly suitable.

Examples of the alloy layer include Sn alloy layers of Ni—Sn ($Ni_3Sn_2$, $Ni_3Sn_4$), Cu—Sn ($Cu_3Sn$, $Cu_6Sn_5$), Fe—Sn (FeSn, $FeSn_2$), Sn—Ag, and Sn—Co and alloy layers of Ni—W, Ni—Cr, and Ti—Ta. An alloy layer of Ni—Sn or Fe—Sn is particularly suitable.

Examples of the metal oxide layer include metal oxide layers of $SnO_2$, $ZrO_2$, $TiO_2$, $WO_3$, $SiO_2$, $Al_2O_3$, $Nb_2O_5$, $IrO_2$, $RuO_2$, $PdO_2$, $Ta_2O_5$, $Mo_2O_5$, and $Cr_2O_3$. A metal oxide layer of $TiO_2$ or $SnO_2$ is particularly suitable.

Examples of the metal nitride layer and the metal carbide layer include metal nitride layers and metal carbide layers of TiN, CrN, TiCN, TiAlN, AlCrN, TiC, WC, SiC, $B_4C$, molybdenum nitride, CrC, TaC, and ZrN. A metal nitride layer of TiN is particularly suitable.

Examples of the carbon material layer include carbon material layers of graphite, amorphous carbon, diamond-like carbon, carbon black, fullerene, and carbon nanotube. A carbon material layer of graphite or diamond-like carbon is particularly suitable.

Examples of the conductive polymer layer include conductive polymer layers of polyaniline and polypyrrole.

The organic resin layer containing a conductive substance contains at least one conductive substance selected from a metal, an alloy, a metal oxide, a metal nitride, a metal carbide, a carbon material, and a conductive polymer included in the aforementioned metal layer, alloy layer, metal oxide layer, metal nitride layer, metal carbide layer, carbon material layer, and conductive polymer layer, and contains at least one organic resin selected from epoxy resin, phenol resin, polyamide-imide resin, polyester resin, polyphenylene sulfide resin, polyamide resin, urethane resin, acrylic resin, polyethylene resin, polypropylene resin, carbodiimide resin, phenol epoxy resin, and the like. As the organic resin layer containing a conductive substance, for example, graphite-dispersed phenol resin or carbon black-dispersed epoxy resin is suitable.

As the conductive substance, a metal and a carbon material (in particular, graphite, carbon black) are suitable. The content of the conductive substance is not limited, as long as predetermined conductivity is obtained in polymer electrolyte fuel cell separators.

Examples of the mixed layer include a mixed layer of TiN-dispersed Ni—Sn alloy.

With the surface-coating layer described above, the electric resistance at the interface between the stainless steel sheet as a substrate and the surface-coating layer can be reduced.

EXAMPLES

Example 1

Blank austenitic stainless steel sheets (steel sheets as cold rolled) of 0.10 mm in thickness having the chemical compositions listed in Table 1 (the balance consisting of Fe and inevitable impurities) were prepared. The prepared stainless steel sheets were subjected to heat treatment, oxide layer removal treatment, etching treatment, and immersion in an oxidizing solution under the conditions listed in Table 2, to obtain austenitic stainless steel sheets for separators.

The "current density" in Table 2 denotes a value obtained by dividing the current flowing between the stainless steel sheet as the material to be treated and the counter electrode by the surface area of the material to be treated. Prior to the etching treatment, the relationship between the current density and the electrolytic voltage applied between the stainless steel sheet as the material to be treated and the counter electrode was studied for each condition and each steel sample ID. It is consequently determined that, for all conditions, current density adjusted to +0.03 mA/cm$^2$ corresponds to the active region.

For sample ID A9 in Table 2, after the etching treatment, electrolysis was performed under the conditions of a treatment temperature of 55° C., a potential of +0.50 V (vs. Ag/AgCl), and a treatment time of 60 sec using a 50 g/L nitric acid aqueous solution. For the stainless steel sheet of steel sample ID B, a potential of +0.50 V (vs. Ag/AgCl) was in the passive region.

Using each resultant austenitic stainless steel sheet for fuel cell separators, (1) contact resistance, (2) resistance to time degradation of contact resistance, (3) corrosion resistance (pitting corrosion resistance), and (4) workability were evaluated as follows.

(1) Evaluation of Contact Resistance

A predetermined sample was cut out of each austenitic stainless steel sheet for fuel cell separators obtained in the above-described manner, within 1 hr after the etching treatment.

The sample was then sandwiched between sheets of carbon paper (TGP-H-120 produced by Toray Industries, Inc.), and further contacted from both sides by Au plated Cu electrodes. A pressure of 0.98 MPa (=10 kg/cm$^2$) per unit area was applied to cause current to flow, and the voltage difference between the electrodes was measured to calculate the electric resistance.

The value obtained by multiplying the measured electric resistance by the area of the contact surface was taken to be the contact resistance value, and the contact resistance was evaluated based on the following criteria. The evaluation results are listed in Table 3.

Pass: 20 mΩ·cm$^2$ or less.
Fail: more than 20 mΩ·cm$^2$.

(2) Evaluation of Resistance to Time Degradation of Contact Resistance

After the immersion in an oxidizing solution, each austenitic stainless steel sheet for fuel cell separators obtained in the above-described manner was stored in the air for 100 hr.

A predetermined sample was then cut out of each austenitic stainless steel sheet for fuel cell separators stored for 100 hr. The sample was sandwiched between sheets of carbon paper (TGP-H-120 produced by Toray Industries, Inc.), and further contacted from both sides by Au plated Cu electrodes. A pressure of 0.98 MPa (=10 kg/cm$^2$) per unit area was applied to cause current to flow, and the voltage difference between the electrodes was measured to calculate the electric resistance.

The value obtained by multiplying the measured electric resistance by the area of the contact surface was taken to be the contact resistance value, and the resistance to time degradation of contact resistance was evaluated based on the following criteria. The evaluation results are listed in Table 3. This evaluation was omitted for some samples evaluated as fail in (1) evaluation of contact resistance.

Pass: contact resistance value after 100 hr of 20 mΩ·cm$^2$ or less, and contact resistance value increase rate of 20% or less.
Fail: contact resistance value after 100 hr of more than 20 mΩ·cm$^2$, or contact resistance value increase rate of more than 20%.

The contact resistance value increase rate is calculated based on the following formula:

[contact resistance value increase rate (%)]=([contact resistance value after 100 hr]−[contact resistance value immediately after etching treatment measured in (1)])/[contact resistance value immediately after etching treatment measured in (1)]×100.

(3) Evaluation of Corrosion Resistance (Pitting Corrosion Resistance)

A predetermined sample was cut out of each austenitic stainless steel sheet for separators stored in the air for 100 hr in the above-described manner.

Using the sample as a working electrode, a platinum wire as a counter electrode, and Ag/AgCl as a reference electrode, the potential was scanned in the anode direction from the immersion potential in a sulfuric acid aqueous solution of pH 3.0 (adjusted using sodium chloride and sulfuric acid) containing 1000 ppm of chloride ions, at 80° C. with a potential scanning rate of 20 mV/min.

The potential at which the current density reached 10 μA/cm$^2$ was taken to be pitting corrosion potential, and the corrosion resistance (pitting corrosion resistance) was evaluated based on the following formula. The evaluation results are listed in Table 3.

Pass (excellent): pitting corrosion potential of more than 0.40 V (vs. Ag/AgCl).
Pass (good): pitting corrosion potential of 0.30 V (vs. Ag/AgCl) or more and 0.40 V (vs. Ag/AgCl) or less.
Fail: pitting corrosion potential of less than 0.30 V (vs. Ag/AgCl).

4) Evaluation of Workability

A JIS No. 13B flat tensile test piece was collected in the rolling direction from each austenitic stainless steel sheet for separators stored in the air for 100 hr in the above-described manner. A tensile test was performed at a tensile rate of 10 mm/min in accordance with JIS Z2241, and the elongation was measured. The workability was then evaluated based on the following formula. The evaluation results are listed in Table 3.
Pass: elongation of 50% or more.
Fail: elongation of less than 50%.

Moreover, a section of each austenitic stainless steel sheet for separators stored in the air for 100 hr was observed and the average height of the projected parts and the average interval between the projected parts were measured by the foregoing methods. The measurement results are listed in Table 3.

Regarding samples for which no projected part of 10 nm or more in height was observed, the average height of the projected parts and the average interval between the projected parts in Table 3 are marked with "-".

Furthermore, [Cr]/[Fe] and the atomic concentration of N existing at the steel sheet surface were measured by the foregoing methods. The measurement results are listed in Table 3. No peak of F was observed in all samples.

TABLE 1

| Steel sample ID | Chemical composition (mass %) | | | | | | | | | | | |
|---|---|---|---|---|---|---|---|---|---|---|---|---|
| | C | Si | Mn | P | S | Cr | Ni | Al | N | Cu | Mo | Others |
| A | 0.039 | 0.61 | 0.90 | 0.031 | 0.003 | 18.07 | 8.12 | 0.001 | 0.038 | — | — | — |
| B | 0.041 | 0.54 | 0.92 | 0.033 | 0.004 | 18.19 | 8.06 | 0.001 | 0.041 | 0.19 | 0.17 | — |
| C | 0.017 | 0.71 | 0.98 | 0.027 | 0.003 | 17.35 | 12.1 | 0.001 | 0.034 | 0.34 | 2.10 | — |
| D | 0.021 | 0.53 | 0.83 | 0.033 | 0.005 | 18.25 | 8.33 | 0.001 | 0.037 | — | — | Ti: 0.14, Nb: 0.22, Zr: 0.05 |
| E | 0.032 | 0.70 | 1.00 | 0.026 | 0.003 | 19.12 | 13.4 | 0.003 | 0.033 | 0.39 | — | — |
| F | 0.027 | 0.68 | 0.99 | 0.027 | 0.003 | 20.90 | 17.9 | 0.009 | 0.031 | 0.37 | — | — |

TABLE 2

| | | Production conditions | | | | | | | | |
|---|---|---|---|---|---|---|---|---|---|---|
| | | Heat treatment | | | Residence time | Oxide layer removal treatment | | | | |
| Sample ID | Steel sample ID | Atmosphere gas | Dew point (° C.) | Maximum temperature (° C.) | in temperature range of 1000° C. or more (sec) | Treatment solution | Treatment temperature (° C.) | Current density (mA/cm$^2$) | Treatment time (sec) | Remarks |
| A1 | A | 100% hydrogen | −65 | 1070 | 15 | 100 g/L sulfuric acid aqueous solution | 75 | −1.0 | 120 | Example |
| A2 | B | 100% hydrogen | −65 | 1070 | 15 | 100 g/L sulfuric acid aqueous solution | 75 | −1.0 | 120 | Example |
| A3 | C | 100% hydrogen | −65 | 1100 | 15 | 100 g/L sulfuric acid aqueous solution | 75 | −1.0 | 300 | Example |
| A4 | D | 100% hydrogen | −65 | 1070 | 15 | 100 g/L sulfuric acid aqueous solution | 75 | −1.0 | 120 | Example |
| A5 | A | 75% hydrogen + 25% nitrogen | −65 | 1070 | 15 | 30 g/L sulfuric acid aqueous solution | 80 | −0.7 | 90 | Example |
| A6 | | 75% hydrogen + 25% nitrogen | −65 | 1070 | 15 | 30 g/L sulfuric acid aqueous solution | 80 | −0.7 | 90 | Example |
| A7 | | 75% hydrogen + 25% nitrogen | −65 | 1070 | 15 | 30 g/L sulfuric acid aqueous solution | 75 | −1.0 | 120 | Example |

TABLE 2-continued

| | | | | | | | | | |
|---|---|---|---|---|---|---|---|---|---|
| A8 | | 75% hydrogen + 25% nitrogen | −65 | 1070 | 15 | 30 g/L sulfuric acid aqueous solution | 75 | −1.0 | 150 | Example |
| A9 | | 75% hydrogen + 25% nitrogen | −65 | 1070 | 15 | 30 g/L sulfuric acid aqueous solution | 75 | −1.0 | 180 | Example |
| A10 | | 75% hydrogen + 25% nitrogen | −65 | 1070 | 15 | 60 g/L sulfuric acid aqueous solution | 75 | −1.0 | 180 | Example |
| A11 | B | 75% hydrogen + 25% nitrogen | −65 | 1070 | 15 | 60 g/L sulfuric acid aqueous solution | 75 | −1.0 | 180 | Example |
| A12 | | 75% hydrogen + 25% nitrogen | −65 | 1070 | 15 | 100 g/L sulfuric acid aqueous solution | 75 | −1.0 | 120 | Example |
| A13 | | 75% hydrogen + 25% nitrogen | −65 | 1070 | 15 | 100 g/L sulfuric acid aqueous solution | 75 | −1.0 | 120 | Example |
| A14 | | 75% hydrogen + 25% nitrogen | −65 | 1070 | 15 | 100 g/L sulfuric acid aqueous solution | 75 | −1.0 | 60 | Example |
| A15 | | 100% nitrogen | −64 | 1100 | 60 | 30 g/L sulfuric acid aqueous solution | 75 | −1.0 | 300 | Example |
| A16 | | 100% nitrogen | −70 | 1100 | 60 | 60 g/L sulfuric acid aqueous solution | 75 | −1.0 | 300 | Example |

| | | Production conditions Etching treatment | | | | | |
|---|---|---|---|---|---|---|---|
| Sample ID | Steel sample ID | Treatment solution | Treatment temperature (° C.) | Current density (mA/cm$^2$) | Treatment time (sec) | Electrolytic potential | Dissolution amount (g/m$^2$) |
| A1 | A | 100 g/L sulfuric acid aqueous solution | 75 | +0.03 | 120 | Active region | 5.7 |
| A2 | B | 100 g/L sulfuric acid aqueous solution | 75 | +0.03 | 120 | Active region | 5.8 |
| A3 | C | 100 g/L sulfuric acid aqueous solution | 75 | +0.03 | 300 | Active region | 1.4 |
| A4 | D | 100 g/L sulfuric acid aqueous solution | 75 | +0.03 | 120 | Active region | 5.6 |
| A5 | A | 30 g/L sulfuric acid aqueous solution | 80 | +0.03 | 90 | Active region | 1.8 |
| A6 | | 30 g/L sulfuric acid aqueous solution | 80 | +0.03 | 90 | Active region | 1.4 |
| A7 | | 30 g/L sulfuric acid aqueous solution | 75 | +0.03 | 120 | Active region | 1.3 |
| A8 | | 30 g/L sulfuric acid aqueous solution | 75 | +0.03 | 150 | Active region | 2.2 |
| A9 | | 30 g/L sulfuric acid aqueous solution | 75 | +0.03 | 180 | Active region | 2.8 |

TABLE 2-continued

| Sample ID | | Treatment solution | | | | | |
|---|---|---|---|---|---|---|---|
| A10 | | 60 g/L sulfuric acid aqueous solution | 75 | +0.03 | 180 | Active region | 6.1 |
| A11 | B | 60 g/L sulfuric acid aqueous solution | 75 | +0.03 | 180 | Active region | 6.0 |
| A12 | | 100 g/L sulfuric acid aqueous solution | 75 | +0.03 | 120 | Active region | 5.4 |
| A13 | | 100 g/L sulfuric acid aqueous solution | 75 | +0.03 | 120 | Active region | 5.4 |
| A14 | | 100 g/L sulfuric acid aqueous solution | 75 | +0.03 | 120 | Active region | 3.6 |
| A15 | | 30 g/L sulfuric acid aqueous solution | 75 | +0.03 | 300 | Active region | 2.4 |
| A16 | | 60 g/L sulfuric acid aqueous solution | 75 | +0.03 | 300 | Active region | 9.2 |

| | Production conditions Immersion or electrolysis | | | | | |
|---|---|---|---|---|---|---|
| Sample ID | Treatment solution | Treatment method | Treatment temperature (° C.) | Treatment time (sec) | Surface rubbing | Remarks |
| A1 | 300 g/L nitric acid aqueous solution | Immersion | 55 | 120 | Not rubbed | Example |
| A2 | 300 g/L nitric acid aqueous solution | Immersion | 55 | 120 | Not rubbed | Example |
| A3 | 300 g/L nitric acid aqueous solution | Immersion | 55 | 120 | Not rubbed | Example |
| A4 | 300 g/L nitric acid aqueous solution | Immersion | 55 | 120 | Not rubbed | Example |
| A5 | 300 g/L nitric acid aqueous solution | Immersion | 55 | 90 | Not rubbed | Example |
| A6 | 300 g/L nitric acid aqueous solution | Immersion | 55 | 90 | Not rubbed | Example |
| A7 | 300 g/L nitric acid aqueous solution | Immersion | 55 | 300 | Not rubbed | Example |
| A8 | 300 g/L nitric acid aqueous solution | Immersion | 55 | 150 | Not rubbed | Example |
| A9 | 300 g/L nitric acid aqueous solution | Electrolysis | 55 | 60 | Not rubbed | Example |
| A10 | 300 g/L nitric acid aqueous solution | Immersion | 55 | 60 | Not rubbed | Example |
| A11 | 300 g/L nitric acid aqueous solution | Immersion | 55 | 180 | Not rubbed | Example |

TABLE 2-continued

| Sample ID | | | | | | Remarks |
|---|---|---|---|---|---|---|
| A12 | 300 g/L nitric acid aqueous solution | Immersion | 55 | 120 | Not rubbed | Example |
| A13 | 300 g/L nitric acid aqueous solution | Immersion | 55 | 120 | Rubbed | Example |
| A14 | 300 g/L nitric acid aqueous solution | Immersion | 55 | 60 | Not rubbed | Example |
| A15 | 300 g/L nitric acid aqueous solution | Immersion | 55 | 300 | Not rubbed | Example |
| A16 | 300 g/L nitric acid aqueous solution | Immersion | 55 | 300 | Not rubbed | Example |

| | | Production conditions | | | | | | | |
|---|---|---|---|---|---|---|---|---|---|
| | | Heat treatment | | | | Oxide layer removal treatment | | | |
| Sample ID | Steel sample ID | Atmosphere gas | Dew point (° C.) | Maximum temperature (° C.) | Residence time in temperature range of 1000° C. or more (sec) | Treatment solution | Treatment temperature (° C.) | Current density (mA/cm$^2$) | Treatment time (sec) | Remarks |
| A17 | C | 75% hydrogen + 25% nitrogen | −65 | 1100 | 15 | 100 g/L sulfuric acid aqueous solution | 75 | −1.0 | 300 | Example |
| A18 | D | 75% hydrogen + 25% nitrogen | −65 | 1070 | 15 | 100 g/L sulfuric acid aqueous solution | 75 | −1.0 | 120 | Example |
| A19 | B | 75% hydrogen + 25% nitrogen | −60 | 1070 | 10 | 100 g/L sulfuric acid aqueous solution | 75 | −1.0 | 10 | Example |
| A20 | B | 75% hydrogen + 25% nitrogen | −60 | 1070 | 10 | 100 g/L sulfuric acid aqueous solution | 75 | −1.0 | 10 | Example |
| A21 | E | 100% hydrogen | −65 | 1070 | 15 | 100 g/L sulfuric acid aqueous solution | 75 | −1.0 | 60 | Example |
| A22 | E | 75% hydrogen + 25% nitrogen | −65 | 1070 | 15 | 100 g/L sulfuric acid aqueous solution | 75 | −1.0 | 60 | Example |
| A23 | F | 75% hydrogen + 25% nitrogen | −65 | 1100 | 15 | 100 g/L sulfuric acid aqueous solution | 75 | −1.0 | 60 | Example |
| A24 | A | 75% hydrogen + 25% nitrogen | −34 | 1070 | 15 | 30 g/L sulfuric acid aqueous solution | 80 | −0.7 | 90 | Example |
| B1 | A | 100% hydrogen | −65 | 1100 | 60 | 30 g/L sulfuric acid aqueous solution | 65 | −1.0 | 90 | Comparative Example |
| B2 | B | 100% hydrogen | −65 | 1070 | 15 | 100 g/L sulfuric acid aqueous solution | 75 | −7.5 | 90 | Comparative Example |
| B3 | B | 100% hydrogen | −65 | 1100 | 60 | 30 g/L hydrochloric acid aqueous solution + 70 g/L nitric acid aqueous solution | 70 | −1.0 | 60 | Comparative Example |

TABLE 2-continued

| | | | | | | | | | |
|---|---|---|---|---|---|---|---|---|---|
| B4 | B | 75% hydrogen + 25% nitrogen | −65 | 1070 | 15 | — | — | — | — | Comparative Example |

| | | Production conditions Etching treatment | | | | | |
|---|---|---|---|---|---|---|---|
| Sample ID | Steel sample ID | Treatment solution | Treatment temperature (° C.) | Current density (mA/cm²) | Treatment time (sec) | Electrolytic potential | Dissolution amount (g/m²) |
| A17 | C | 100 g/L sulfuric acid aqueous solution | 75 | +0.03 | 300 | Active region | 1.2 |
| A18 | D | 100 g/L sulfuric acid aqueous solution | 75 | +0.03 | 120 | Active region | 5.1 |
| A19 | B | 100 g/L sulfuric acid aqueous solution | 75 | +0.30 | 60 | Active region | 1.0 |
| A20 | B | 100 g/L sulfuric acid aqueous solution | 75 | +3.00 | 60 | Active region | 1.5 |
| A21 | E | 100 g/L sulfuric acid aqueous solution | 75 | +0.03 | 300 | Active region | 1.7 |
| A22 | E | 100 g/L sulfuric acid aqueous solution | 75 | +0.03 | 300 | Active region | 1.4 |
| A23 | F | 100 g/L sulfuric acid aqueous solution | 75 | +0.03 | 300 | Active region | 1.2 |
| A24 | A | 30 g/L sulfuric acid aqueous solution | 80 | +0.03 | 90 | Active region | 1.5 |
| B1 | A | 30 g/L sulfuric acid aqueous solution | 65 | +0.03 | 90 | Active region | 0.3 |
| B2 | B | 100 g/L sulfuric acid aqueous solution | 75 | +0.03 | 90 | Active region | 1.0 |
| B3 | B | 30 g/L hydrochloric acid aqueous solution + 70 g/L nitric acid aqueous solution | 70 | +0.03 | 60 | Active region | 21.6 |
| B4 | B | — | — | — | — | — | — |

| | | Production conditions Immersion or electrolysis | | | | |
|---|---|---|---|---|---|---|
| Sample ID | Treatment solution | Treatment method | Treatment temperature (° C.) | Treatment time (sec) | Surface rubbing | Remarks |
| A17 | 300 g/L nitric acid aqueous solution | Immersion | 55 | 120 | Not rubbed | Example |
| A18 | 300 g/L nitric acid aqueous solution | Immersion | 55 | 120 | Not rubbed | Example |

TABLE 2-continued

| | | | | | | |
|---|---|---|---|---|---|---|
| | A19 | 300 g/L nitric acid aqueous solution | Immersion | 55 | 60 | Not rubbed | Example |
| | A20 | 300 g/L nitric acid aqueous solution | Immersion | 55 | 60 | Not rubbed | Example |
| | A21 | 300 g/L nitric acid aqueous solution | Immersion | 55 | 60 | Not rubbed | Example |
| | A22 | 300 g/L nitric acid aqueous solution | Immersion | 55 | 60 | Not rubbed | Example |
| | A23 | 300 g/L nitric acid aqueous solution | Immersion | 55 | 60 | Not rubbed | Example |
| | A24 | 300 g/L nitric acid aqueous solution | Immersion | 55 | 90 | Not rubbed | Example |
| | B1 | 300 g/L nitric acid aqueous solution | Immersion | 55 | 60 | Not rubbed | Comparative Example |
| | B2 | — | — | — | — | — | Comparative Example |
| | B3 | 300 g/L nitric acid aqueous solution | Immersion | 55 | 60 | No rubbed | Comparative Example |
| | B4 | — | — | — | — | — | Comparative Example |

TABLE 3

| | | | | | | Evaluation results | | | | | |
|---|---|---|---|---|---|---|---|---|---|---|---|
| | | | | [Cr] in chemical form other than metal/ [Fe] in chemical form other than metal | | (1) Contact resistance Contact resistance value immediately after treatment (mΩ·cm$^2$) | (2) Resistance to time degradation of contact resistance | | | | |
| Sample ID | Steel sample ID | Average height of projected parts (nm) | Average interval between projected parts (nm) | | Atomic concentration of N (at %) | | Contact resistance value after 100 hr (mΩ·cm$^2$) | Contact resistance value increase rate (%) | (3) Corrosion resistance | (4) Workability | Remarks |
| A1 | A | 61 | 149 | 1.2 | <0.1 | 13.6 | 14.7 | 8.1 | Pass (good) | Pass | Example |
| A2 | B | 52 | 138 | 1.3 | <0.1 | 13.7 | 14.9 | 8.7 | Pass (good) | Pass | Example |
| A3 | C | 32 | 90 | 1.8 | <0.1 | 12.6 | 13.1 | 4.0 | Pass (good) | Pass | Example |
| A4 | D | 55 | 125 | 1.3 | <0.1 | 13.5 | 14.9 | 10.4 | Pass (good) | Pass | Example |
| A5 | A | 45 | 114 | 1.2 | 6.6 | 15.5 | 18.5 | 19.4 | Pass (excellent) | Pass | Example |
| A6 | B | 43 | 100 | 1.2 | 6.9 | 15.2 | 18.2 | 19.7 | Pass (excellent) | Pass | Example |
| A7 | | 38 | 93 | 1.5 | 6.8 | 16.2 | 18.7 | 15.4 | Pass (excellent) | Pass | Example |
| A8 | | 44 | 114 | 1.3 | 5.4 | 16.5 | 18.0 | 9.1 | Pass (excellent) | Pass | Example |
| A9 | | 52 | 138 | 1.3 | 3.9 | 15.4 | 16.9 | 9.7 | Pass (excellent) | Pass | Example |
| A10 | | 57 | 149 | 1.2 | 6.6 | 13.9 | 14.9 | 7.2 | Pass (excellent) | Pass | Example |
| A11 | | 50 | 114 | 1.4 | 5.5 | 13.1 | 13.8 | 5.3 | Pass (excellent) | Pass | Example |
| A12 | | 43 | 111 | 1.4 | 5.1 | 13.4 | 14.0 | 4.5 | Pass (excellent) | Pass | Example |

TABLE 3-continued

| Sample ID | Steel sample ID | Average height of projected parts (nm) | Average interval between projected parts (nm) | [Cr] in chemical form other than metal/[Fe] in chemical form other than metal | Atomic concentration of N (at %) | (1) Contact resistance Contact resistance value immediately after treatment (mΩ·cm²) | (2) Resistance to time degradation of contact resistance — Contact resistance value after 100 hr (mΩ·cm²) | Contact resistance value increase rate (%) | (3) Corrosion resistance | (4) Workability | Remarks |
|---|---|---|---|---|---|---|---|---|---|---|---|
| A13 |   | 47 | 143 | 1.2 | 6.6 | 12.7 | 13.6 | 7.1 | Pass (excellent) | Pass | Example |
| A14 |   | 42 | 103 | 1.4 | 6.0 | 14.6 | 15.7 | 7.5 | Pass (excellent) | Pass | Example |
| A15 |   | 39 | 93 | 1.9 | 9.3 | 17.5 | 19.8 | 13.3 | Pass (excellent) | Pass | Example |
| A16 |   | 62 | 157 | 1.6 | 4.3 | 12.9 | 13.9 | 7.4 | Pass (excellent) | Pass | Example |
| A17 | C | 35 | 93 | 1.8 | 6.9 | 12.6 | 13.1 | 4.0 | Pass (excellent) | Pass | Example |
| A18 | D | 46 | 125 | 1.4 | 5.0 | 13.5 | 14.2 | 5.2 | Pass (excellent) | Pass | Example |
| A19 | B | 43 | 93 | 1.3 | 6.7 | 15.7 | 17.1 | 8.9 | Pass (excellent) | Pass | Example |
| A20 | B | 40 | 100 | 1.3 | 6.8 | 11.7 | 12.2 | 4.3 | Pass (excellent) | Pass | Example |
| A21 | E | 45 | 111 | 1.7 | <0.1 | 14.4 | 15.5 | 7.6 | Pass (good) | Pass | Example |
| A22 | E | 38 | 100 | 1.7 | 5.2 | 14.5 | 15.7 | 8.3 | Pass (excellent) | Pass | Example |
| A23 | F | 39 | 93 | 1.8 | 5.0 | 14.8 | 15.8 | 6.8 | Pass (excellent) | Pass | Example |
| A24 | A | 34 | 90 | 1.2 | <0.1 | 15.8 | 18.4 | 16.5 | Pass (good) | Pass | Example |
| B1 | A | 24 | 71 | 1.2 | <0.1 | 19.3 | 25.4 | 31.6 | Pass (good) | Pass | Comparative Example |
| B2 | B | 31 | 93 | 0.8 | <0.1 | 17.6 | 23.8 | 35.2 | Fail | Pass | Comparative Example |
| B3 | B | 310 | 744 | 1.2 | <0.1 | 48.6 | Not measured | — | Pass (good) | Pass | Comparative Example |
| B4 | B | — | — | 0.8 | 7.0 | More than 100 | Not measured | — | Pass (good) | Pass | Comparative Example |

The results in Table 3 reveal the following:
(a) In all Examples, the desired low contact resistance was obtained, and also the resistance to time degradation of contact resistance was superior. The workability and the corrosion resistance (pitting corrosion resistance) were superior, too.
(b) In all Comparative Examples, the desired low contact resistance and/or the resistance to time degradation of contact resistance was not obtained.

The invention claimed is:

1. An austenitic stainless steel sheet for fuel cell separators, comprising
a textured structure at a surface of the austenitic stainless steel sheet, the textured structure having recessed parts and projected parts, an average height of the projected parts being 30 nm or more and 62 nm or less, and an average interval between the projected parts being 20 nm or more and 350 nm or less,
wherein a ratio [Cr]/[Fe] of an atomic concentration of Cr existing in chemical form other than metal to an atomic concentration of Fe existing in chemical form other than metal at the surface of the austenitic stainless steel sheet is 1.0 or more.

2. The austenitic stainless steel sheet for fuel cell separators according to claim 1, wherein an atomic concentration of N existing at the surface of the austenitic stainless steel sheet is 1.0 at % or more.

3. A production method for an austenitic stainless steel sheet for fuel cell separators, comprising:
preparing a blank austenitic stainless steel sheet comprising an oxide layer at a surface thereof, the oxide layer being a passive film formed in air or a layer formed during annealing in production of the blank austenitic stainless steel sheet;
thereafter subjecting the blank austenitic stainless steel sheet to oxide layer removal treatment by anodic electrolysis, cathodic electrolysis, or a combination of anodic electrolysis and cathodic electrolysis;
thereafter subjecting the blank austenitic stainless steel sheet to etching treatment with a dissolution amount of 1.0 g/m² to 20.0 g/m², in an active region of the blank austenitic stainless steel sheet; and
thereafter subjecting the blank austenitic stainless steel sheet to immersion in an oxidizing solution or electrolysis in a passive region of the blank austenitic stainless steel sheet.

4. The production method for an austenitic stainless steel sheet for fuel cell separators according to claim 3, further comprising
subjecting, before the oxide layer removal treatment, the blank austenitic stainless steel sheet to heat treatment under conditions that a treatment atmosphere has a nitrogen concentration of 5 vol % or more and a dew point of −45° C. or less, a maximum temperature is 1000° C. or more and 1200° ° C. or less, and a residence time in a temperature range of 1000° C. or more is 1 sec or more and 300 sec or less.

\* \* \* \* \*